United States Patent
Welygan et al.

[11] Patent Number: 6,060,009
[45] Date of Patent: May 9, 2000

[54] METHOD OF LAMINATE FORMATION

[75] Inventors: Dennis G. Welygan, Woodbury; Louis S. Moren, Mahtomedi, both of Minn.

[73] Assignee: 3M Innovative Properties Company, St. Paul, Minn.

[21] Appl. No.: 09/025,576

[22] Filed: Feb. 18, 1998

[51] Int. Cl.[7] .............................. B29C 47/06; B32B 3/00; B32B 31/30

[52] U.S. Cl. .............. 264/167; 156/244.11; 156/244.25; 264/171.13; 264/171.23

[58] Field of Search ............................... 264/167, 171.13, 264/171.23; 156/244.11, 244.25

[56] References Cited

U.S. PATENT DOCUMENTS

| | | |
|---|---|---|
| 4,196,731 | 4/1980 | Laurine et al. . |
| 4,386,188 | 5/1983 | Grancio et al. . |
| 4,872,243 | 10/1989 | Fischer . |
| 5,077,870 | 1/1992 | Melbye et al. . |
| 5,092,952 | 3/1992 | Minnick et al. . |
| 5,171,619 | 12/1992 | Reuben . |
| 5,246,523 | 9/1993 | Minnick et al. . |
| 5,248,368 | 9/1993 | Minnick et al. . |
| 5,248,369 | 9/1993 | Minnick et al. . |
| 5,248,373 | 9/1993 | Minnick et al. . |
| 5,260,015 | 11/1993 | Kennedy et al. . |
| 5,372,620 | 12/1994 | Rowse et al. . |
| 5,393,475 | 2/1995 | Murasaki et al. . |
| 5,573,844 | 11/1996 | Donovan et al. ...................... 442/183 |
| 5,686,527 | 11/1997 | Laurin et al. . |

FOREIGN PATENT DOCUMENTS

| | | |
|---|---|---|
| 0 241 667 A2 | 10/1987 | European Pat. Off. . |
| 0 499 472 A1 | 8/1992 | European Pat. Off. . |
| 0 712 892 A1 | 5/1996 | European Pat. Off. . |
| 08 090740 | 4/1996 | Japan . |
| WO 93/04858 | 3/1993 | WIPO . |
| WO 95/33006 | 12/1995 | WIPO . |
| WO 96/21058 | 7/1996 | WIPO . |
| WO 97/32805 | 9/1997 | WIPO . |

OTHER PUBLICATIONS

Brochure: 3M Traction Wrap for textile drive and pull rolls (1997).
Shell Chemical Company—Online Literature, "Modification of Thermoplastics With Kraton Polymers", pp. 1–28 (Undated).
Abstract of Japan 58–215446 (Published Dec. 14, 1983).
Abstract of Japan 5–163394 (Published Jun. 29, 1993).
Abstract of Japan 10–001573 (Published Jan. 6, 1998).
Abstract of Japan 8–090740 (Published Apr. 9, 1996).

*Primary Examiner*—Leo B. Tentoni
*Attorney, Agent, or Firm*—Paul W. Busse

[57] ABSTRACT

A method is provided that includes a starting material of a first sheet having first and second major sides, with the first side of the first sheet being adapted for adherence to a substrate sheet, and providing a second porous sheet having first and second major sides. The first side of the second porous sheet is aligned against the second side of the first sheet. A molten thermoplastic material is introduced onto the second side of the second porous sheet. The method includes the step of simultaneously urging the molten thermoplastic material against the second porous sheet to force portions of the thermoplastic material to flow through the second porous sheet and into adhering contact with the second side of the first sheet, and molding a desired surface pattern on an exposed surface of the molten thermoplastic material. The molten thermoplastic material is cooled to bind the material to the first and second sheets and define a laminated assembly.

14 Claims, 7 Drawing Sheets

METHOD OF LAMINATE FORMATION

BACKGROUND OF THE INVENTION

The present invention relates to covers deployable over a substrate wherein the covers comprise specific types of polyolefins and thermoplastic block copolymers. The invention also relates to methods for lamination during assembly of roll covers.

Covers typically include a layer of material placed over an object for purposes of concealing and protecting. Some covers consist of more than one layer of material and have unique designs and physical characteristics allowing them to be used in various applications. Such applications include surfaces with good traction. One example of such applications are mousepads having surfaces contacting a movable hand piece called a "mouse" and a table. Most mousepad surfaces have specific traction characteristics enabling the "mouse" to suitably glide across the mousepad surface while preventing the mouse ball from slipping on the surface. The main purpose of the mousepad is to provide a suitable surface for the mouse while the protection of the table covered by the mousepad is less important. Anti-slip mats also have surfaces with specific traction characteristics for the purpose of preventing slippage of objects or people traversing the surface of the mat.

Another application for covers is observed in the textile industry. In the textile industry, covers are used over rolls that convey, pull and tension fabric. Such rolls are referred to as pull rolls. Weaving machines, inspection machines, finishing lines, napping lines, sueding lines and dye lines all contain numerous pull rolls. The pull rolls are typically made of steel or aluminum and by themselves are unable to provide surfaces with sufficient frictional forces to keep fabric from slipping. Covers are placed over the rolls with the covers having surfaces with higher frictional forces than the roll itself. The covers attached to the roll guides the fabric through the textile processing machinery preventing the weave of the fabric from becoming distorted and keeping the advancement and spread of the fabric uniform.

It is desirable that a cover used on a pull roll, or other types of rolls, is made of a relatively inexpensive material having a high static coefficient of friction and having characteristics of enhanced durability. During the weaving process, slippage of material may occur resulting in defects in the fabric. Using roll covers with a high static coefficient of friction will minimize slippage and enhance quality of the fabric. A durable cover is abrasion resistant and does not need to be replaced as frequently. To replace a roll cover the weaving process must be stopped. It may take some time to replace a cover and during that time fabric is not being manufactured.

Materials used as roll covers include cork, rubber, modified cork, smooth rubber, sandpaper and bristle-bearing materials. Covers made out of polyurethanes typically have physical properties better than coverings made of traditional rubber. However, polyurethane coverings are economically prohibitive for use in all but the most exacting applications. Rubbers such as polyisoprene could be used to make an inexpensive cover, but rubbers typically lack the physical properties of a high static coefficient of friction, toughness, and wear resistance.

SUMMARY OF THE INVENTION

The present invention embodies durable, abrasion resistant covers made of materials that provide, in part, a surface with a high static coefficient of friction. Typically, the covers are used as traction covers providing frictional engagement to items in contact with a surface of the cover.

One embodiment of the invention is a cover for a substrate surface including a layer of cover material having a first surface and an opposite second surface that is deployable over the substrate surface. The layer of cover material is made of a polypropylene comprising less than 90 percent isotactic linkages, and a thermoplastic block copolymer comprising hard segments of polystyrene combined with soft segments. The thermoplastic block copolymer used to make the layer of cover material typically has a Shore A hardness greater than about 30. The cover is suitable for applications requiring a surface with good traction.

Another embodiment of the invention is a cover for a substrate surface that includes a layer of cover material having a first surface and an opposite second surface that is deployable over the substrate surface. The layer of cover material comprises a metallocene-catalyzed polypropylene and a thermoplastic block copolymer comprising hard segments of polystyrene combined with soft segments. The thermoplastic block copolymer used to make the layer of cover material typically has a Shore A hardness greater than about 30.

Another embodiment of the invention is a cover for a substrate surface that includes a layer of cover material having a first surface and an opposite second surface that is deployable over the substrate surface. The layer of cover material comprises a metallocene-catalyzed polypropylene and a thermoplastic block copolymer comprising hard segments of polystyrene combined with soft segments to provide the first surface with a coefficient of friction of greater than about 0.6.

The invention also embodies a traction roll. The traction roll comprises a roll having an outer cylindrical surface, and a roll cover. The roll cover comprises a layer of cover material having a first surface and an opposite second surface deployable over the cylindrical surface. The layer of cover material comprises a polypropylene comprising less than 90 percent isotactic linkages, and a thermoplastic block copolymer comprising hard segments of polystyrene combined with soft segments. The thermoplastic block copolymer typically has a Shore A hardness greater than about 30.

The invention also embodies another traction roll. The traction roll comprises a roll having an outer cylindrical surface, and a roll cover. The roll cover comprises a layer of cover material having a first surface and an opposite second surface deployable over the cylindrical surface. The layer of cover material comprises a metallocene-catalyzed polypropylene; and a thermoplastic block copolymer comprising hard segments of polystyrene combined with soft segments. The thermoplastic block copolymer typically having a Shore A hardness greater than about 30.

The invention also embodies a method for forming a cover for a substrate surface. The method includes providing a first sheet having first and second major sides, with the first side of the first sheet being adapted for adherence to a substrate sheet, and providing a second porous sheet having first and second major sides. The first side of the second porous sheet is aligned against the second side of the first sheet. A molten thermoplastic material is introduced onto the second side of the second porous sheet. The method includes the step of simultaneously urging the molten thermoplastic material against the second porous sheet to force portions of the thermoplastic material to flow through the second porous sheet and into adhering contact with the second side of the first sheet, and molding a desired surface pattern on an exposed surface of the molten thermoplastic material. The molten thermoplastic material is cooled to bind the material to the first and second sheets and define a laminated assembly.

BRIEF DESCRIPTION OF THE DRAWINGS

The present invention will be further explained with reference to the figures referenced below.

FIG. 9 is a top view of a mold pattern for forming the cover illustrated in FIGS. 5 or 6.

FIG. 10 is a schematic illustration of an apparatus and process for forming he cover of the present invention.

FIG. 11 is a schematic illustration of an alternative apparatus and process for, in part, forming an alternative cover of the present invention.

FIG. 12 is a schematic illustration of an apparatus and process for finalizing the formation of the alternative cover of the present invention partially formed in FIG. 11.

FIG. 13 is an isometric view of a textile web being advanced over a pull roll cover of the present invention.

FIG. 14 is a schematic view of a strip of pull roll cover material partially wound over a pull roll.

FIG. 15 is a sectional view as taken along lines 15—15 in FIG. 14.

FIG. 16 is a schematic illustration of another apparatus and process for forming an alternative cover of the present invention.

FIG. 17 is a schematic illustration of another apparatus and process for forming an alternative cover of the present invention.

FIG. 18 is a schematic illustration of an alternative apparatus and process for, in part, forming an alternative cover of the present invention.

Figure 1:
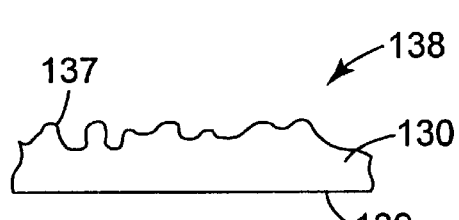
FIG. 1 is a schematic side view of a cover.

While the above-identified drawings features set forth several preferred embodiments, other embodiments of the present invention are also contemplated, as noted in the discussion. This disclosure presents illustrative embodiments of the present invention by way of representation and not limitation. Numerous other modifications and embodiments can be devised by those skilled in the art which fall within the scope and spirit of the principles of this invention.

DETAILED DESCRIPTION

Typically, covers embodied by this invention are applied to substrate surfaces to enhance surface traction. For example, they may be placed over substrate surfaces having a static coefficient of friction lower than the surfaces of the covers. Some covers of the present invention are made of materials, including specific polypropylenes and thermoplastic block copolymers. Other covers are made of materials, including metallocene-polyolefins and thermoplastic block copolymers. The specific polypropylenes, metallocene-polyolefins, and thermoplastic block copolymers were selected to provide, in part, an abrasion resistant cover with at least one surface having a high static coefficient of friction. The covers may also have other beneficial characteristics such as desirable tensile breaking stress, desirable elongation at break, and desirable percent elongation at yield.

Polypropylenes and Metallocene-Polyolefins

The material forming the covers of the invention include polypropylenes. The preferred polypropylenes include polypropylenes with less than 90 percent isotactic linkages. Isotactic linkages refers to one of the three arrangements that are possible during the polymerization of propylene in which all methyl groups are on one side of an extended chain. The procedure for measuring the percent isotactic linkages of polypropylene is described in the Example Section of this patent application labeled Procedure II For Measuring The Tacticity Of Polypropylene. Some suitable polypropylenes with less than 90 percent isotactic linkages include the products sold under the trade name REXFLEX FPO W101, REXFLEX FPO W108, and REXFLEX FPO W104 by the Rexene Products Company of Dallas, Tex. It is even more desirable that the polypropylenes used in the invention have about 50 percent to 70 percent isotactic linkages.

Other preferred polypropylenes include the metallocene-catalyzed propylenes. Examples of such metallocene-catalyzed propylenes include those sold under the name HIMONT KS-074 and HIMONT KS-084P sold by Montell USA Inc. of Wilmington, Del.

Other materials forming the covers of the invention include metallocene-catalyzed polyolefins. It is preferred that a cover made out of a blend of metallocene-catalyzed polyolefin and thermoplastic block copolymer, or any blend, have at least one surface with a coefficient of friction of greater than 0.6.

Thermoplastic Block Copolymers

Some material used to make a cover include polypropylenes such as a polypropylene having less than 90 percent isotactic linkages or a metallocene-catalyzed polypropylene and thermoplastic block copolymers. Other materials used to make a cover include metallocene-catalyzed polyolefins and thermoplastic block copolymers. The thermoplastic block copolymers are selected on the basis of compatibility with the polypropylene or metallocene polyolefins and their ability to provide, in part, a durable-abrasion resistant cover with a surface having a high static coefficient of friction. In general terms, block copolymers are macromolecules comprised of chemically dissimilar, terminally connected segments. Their sequential arrangement can vary from A-B structures, containing two segments only, to A-B-A block copolymers with three segments, to multiblock -$(A-B)_n$- systems possessing many segments. A unique development resulting from block copolymer technology is the concept of thermoplastic elastomeric behavior. Block copolymer systems of this type are characterized by rubbery behavior in the absence of chemical cross-linking. This feature permits the fabrication of these materials by means of conventional thermoplastic processing techniques. The key to this unique behavior is the ability to achieve a network structure by physical rather than chemical means. This, in turn results from finely controlled morphology in A-B-A or- $(A-B)_n$- systems containing both flexible and rigid segments.

The simplest arrangement, or architecture, of a block copolymer is the diblock structure, commonly referred to as an A-B block copolymer, which is composed of one segment of "A" repeat units and one segment of "B" repeat units. The second form is the triblock, or A-B-A, structure, containing a single segment of "B" repeat units located between two segments of "A" repeat units. The third basic type is the -(A-B)$_n$- multiblock copolymer, which are composed of many alternating "A" and "B" blocks. Another, but less common variation is the radial block copolymer. This structure takes the form of a star-shaped macromolecule in which three or more diblock sequences radiate from a central hub. Suitable thermoplastic block copolymers useful for forming a cover material may contain a specific block copolymer architecture described above. It is preferred that the thermoplastic block copolymer in this invention is the triblock, or A-B-A structure.

From a mechanical property point of view, block copolymers may be conveniently divided, on the basis of room temperature modulus, into two classes—rigid and elastomeric. Rigid materials may be comprised of either two hard segments or of one hard segment together with a minor fraction of a soft segment. A hard segment is defined as one that has a $T_g$ and/or $T_m$ above room temperature, while a soft segment has a $T_g$ (and possibly) a $T_m$) below room temperature. Elastomeric block copolymers normally contain a soft segment together with a minor proportion of a hard segment. Additional characteristics of block copolymers are described in "Block Copolymers Overview and Critical Survey", Allen Noshay, James E, McGrath, Academic Press, 1977, incorporated herein by reference.

It is preferred that thermoplastic block copolymers used in this invention be elastomeric and include hard segments of styrene monomer units and soft segments comprising carbon chains including 2 to 8 carbon atoms. Suitable commercially available thermoplastic block copolymers include (SBS) styrene-butadiene-styrene block copolymer, (SIS) styrene-isoprene-styrene block copolymer, (SEBS) styrene-ethylene-butylene-styrene block copolymer, (SEP) styrene-ethylene-propylene block copolymer, (SB)$_n$ styrene-butadiene or (SI)$_n$ styrene-isoprene multi-arm (branched) copolymer, (EP)$_n$ ethylene-propylene multi-arm (branched) polymer. It is preferred that the soft segments of the block copolymer include butadiene, isoprene, ethylene, propylene, butylene, and combinations thereof. It is most preferred that the thermoplastic block copolymer have soft segments comprising ethylene and butylene. The preferred Shore A hardness of the thermoplastic block copolymers used in blends is greater than about 30. It is preferred that the hard segments of polystyrene comprise less than about 30 percent by weight of the lock copolymer. It is most preferred that the hard segments of polystyrene comprise about 13 percent by weight of the block copolymer.

Polymer Blends

Polymer blends of the invention include a polypropylene having less than 90 percent isotactic linkages and a thermoplastic block copolymer, a metallocene-catalyzed polypropylene and a thermoplastic block copolymer, and a metallocene-catalyzed polyolefin and a thermoplastic block copolymer.

The blends vary in weight percentages of its components. There are preferred ranges for polymer blend including a polypropylene having less than 90 percent isotactic linkages and thermoplastic block copolymers. Typically, a polymer blend will have about 80 percent by weight of a polypropylene having less than 90 percent isotactic linkages and about 20 percent by weight of a thermoplastic block copolymer to about 20 percent by weight of a polypropylene having less than 90 percent isotactic linkages and 80 percent by weight of a thermoplastic block copolymer. Preferably, a polymer blend will have about 60 percent by weight of a polypropylene having less than 90 percent isotactic linkages and about 40 percent by weight of a thermoplastic block copolymer to about 40 percent by weight of a polypropylene having less than 90 percent isotactic linkages and 60 percent by weight of a thermoplastic block copolymer.

Polymer blends including a polypropylene having less than 90 percent isotactic linkages have physical measurements more desirable than the physical measurements of the specified polypropylene or specified thermoplastic block copolymers used to make the blend. These physical characteristics include tensile breaking stress, percent elongation at break, and abrasion resistance (measured in grams abraded) as illustrated in the Example Section of this patent application. In addition, a specific blend containing a polypropylene having less than 90 percent isotactic linkages typically has a static coefficient of friction enhanced over a similar blend using polypropylene having greater than 90 percent isotactic linkages as illustrated in the Example Section.

There are preferred ranges for polymer blends including metallocene-catalyzed polypropylenes and thermoplastic block copolymers. Typically, a polymer blend will have about 80 percent by weight of a metallocene-catalyzed polypropylene and about 20 percent by weight of a thermoplastic block copolymer to about 20 percent by weight of a metallocene-catalyzed polypropylene and 80 percent by weight of a thermoplastic block copolymer. Preferably, a polymer blend will have about 60 percent by weight of a metallocene-catalyzed polypropylene and about 40 percent by weight of a thermoplastic block copolymer to about 40 percent by weight of a metallocene-catalyzed polypropylene and 60 percent by weight of a thermoplastic block copolymer.

A polymer blend may also include a metallocene-catalyzed polyolefin and a thermoplastic block copolymer. It is preferred that a layer of cover material made out of such a blend having at least one surface with a static coefficient of friction of greater than about 0.6.

It is preferred that all blends of this invention have about 10 percent to 40 percent elongation at yield. Preferably, the percent elongation at yield will be between about 13 percent to 40 percent. All polymer blends may also include additives such as fillers, fibers, antistatic agents, lubricants, wetting agents, foaming agents, surfactants, pigments, dyes, coupling agents, plasticizers, suspending agents and the like.

Figure 9:
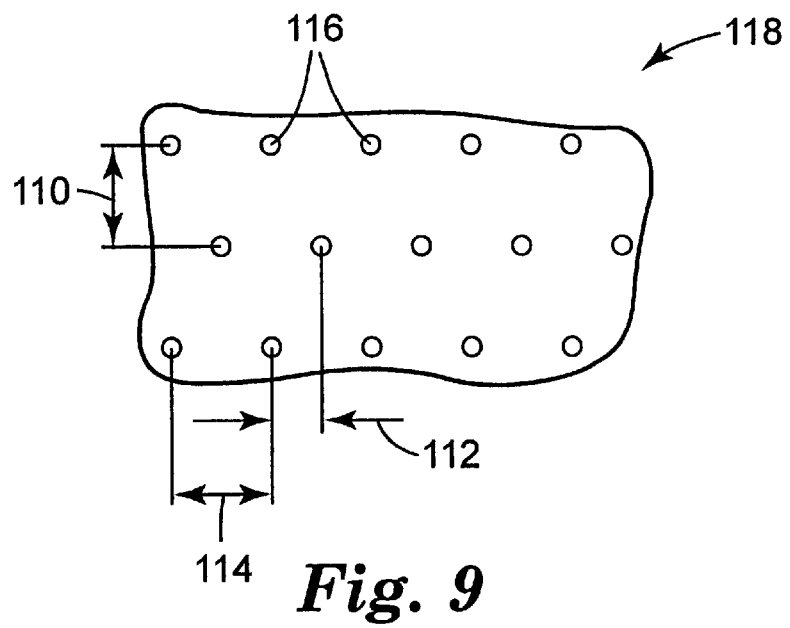
In FIGS. 9 through 18, like structures are referred to by like numerals throughout the several views. The FIGS. are not drawn to scale.

The static coefficient of friction of a cover may also be manipulated by mechanical design. A cover usually has two major surfaces and the surfaces of the cover may have a topography that is substantially flat or shaped. The topography of the cover may increase or decrease the static coefficient of friction of the cover surface. One method of modifying the topography of a cover surface is by molding. The mold surface may be prepared by knurling, drilling, etching, machining, or by other methods known in the art. A cover surface may be made having a topography with a shape that is the inverse of the mold. Most cover surfaces have topographies corresponding to a particular application. Numerous applications exist for covers with a specific surface topography such as a substantially flat shape (i.e., smooth surface), irregular shapes, precise shapes, geometric shapes such as cylinders, pyramids, rectangles squares, and the like. The cover surface may have a topography with a random or non-random array of a shape or shapes on the surface of the cover. One preferred design is a non-random array of a cylinder shape, called a stem, on the surface of a cover. The mold used to create this topography is illustrated in FIG. 9. FIG. 9 is a top view of mold 118 used to make a cover. The mold has a non-random placement of cylinders cavities 116 on its surface. In a first direction 110 there is a distance of 0.254 cm between the cylinder cavities 116. In a second direction 112 there is a distance of 0.127 cm between the cylinder cavities 116. In a third direction 114 there is a distance of 0.254 cm between the cylinder cavities 116. The diameter of the cylinder cavities 116 of the mold 118 are about 0.159 cm and a depth of 0.318. The cover made by the mold 118 will have the approximate inverse shape of the mold 118. Suitable topographies of cover surfaces and methods of making are described in U.S. Pat. No. 5,908,680 and U.S. application Ser. No. 08/939,726 filed Oct. 3, 1997. Covers may be used, in part, as a mat, a mousepad, a pull roll cover, an anti-slip surface, a high friction film, an abrasion resistant film, a conveyor belt, and a protective film coating. Covers As mentioned, a cover may be used in a wide variety of applications and designed with particular applications in mind. One example of a simple cover is illustrated in FIG. 1. The cover 138 consists of a single layer of cover material 130 comprising a polymer blend of the invention. Though the cover 138 has a single layer of cover material 130, a cover maybe designed having multiple layers with each layer of the cover being made out of the same or different material. The first layer of cover material 130 also has two major outer surfaces, a first surface 137 and an opposite second surface 139. The second surface 139 of cover 138 has a topography that is substantially flat and capable of being deployable over a substrate surface. The second surface 139 topography need not be flat and could have any number of surface features. The first surface 137 has a topography that is irregularly shape; however, there is no requirement that the topography of the first surface 137 of the cover 138 be shaped.

Figure 2:
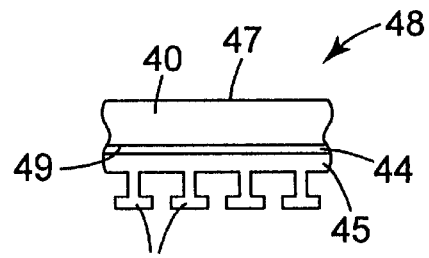
FIG. 2 is a schematic side view of another cover.

FIG. 2 illustrates an example of a cover having an attachment means. The cover 48 consists of a single layer of cover material 40 comprising a polymer blend of the current invention. The layer of cover material 40 has a first surface 47 and an opposite second surface 49, a film layer 45 and a layer of adhesive 44 interposed between the layer of cover material 40 and the film layer 45. The topography of the first surface is illustrated as being flat but may be shaped depending upon the specific application of the cover. The layer of adhesive 44 is for purposes of attaching the second surface 49 of the layer of cover material 40 to the film layer 45. Suitable adhesives include heat bonding film, heat bonding non-wovens, hot melt pressure sensitive adhesives, and dual-sided laminating film adhesives. The film layer 45 comprises an integral array of hook structures 46 used to releasably secure the layer of cover material to a substrate surface. The hook structures 46 typically adhere to a surface substrate that is provided with an array of loop structures. Suitable materials for the film layer having an integral array of hooks and additional characteristics of hook and loop structures are described in U.S. Pat. No. 5,908,680 and U.S. application Ser. No. 08/939,726 filed Oct. 3, 1997 and U.S. Pat. No. 5,077,870 (Melbye et al.). Though cover 48 illustrates a hook structures 46 that will adhere to loop structures, there are numerous ways of attaching the second surface of a cover to a substrate surface. The second surface of a cover may be secured to a substrate surface by mechanical features such as clamping, screwing, nailing, tacking, and the like, and/or adhesive features such as hot melt adhesives, liquid adhesives, and double sided film adhesives. The second surface of a cover may be releasably secured to a substrate by a hook and loop type mechanisms and repositionable adhesives. The substrate to which a cover may be secured includes almost all objects with a surface, such as a table, chair, floor, walls, ground and the like. In the textile industry, covers are preferably secured to cylinders, typically called rolls, used in processing equipment. These covers have specific dimensions, such as thickness, described in U.S. Pat. No. 5,908,680 and U.S. application Ser. No. 08/939,726 filed Oct. 3, 1997.

Figure 3:
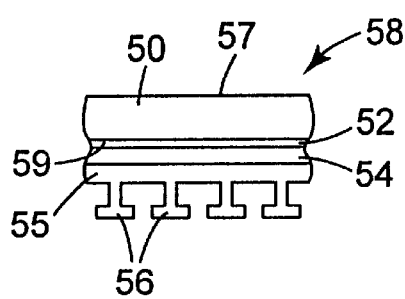
FIG. 3 is a schematic side view of another cover.

FIG. 3 is an example of a cover 58 consisting of a layer of cover material 50 comprising a polymer blend of the current invention. The layer of cover material 50 has a first surface 57 and a second surface 59. The topography of the first surface 57 is substantially flat, but could be shaped if required for a particular application. The cover 58 includes a film layer 55 having an integral array of hook structures 56. Interposed between the layer of cover material 50 and the film layer 55 is a layer of adhesive 54 and a layer of porous material 52. Typically the porous material is embedded into the layer of cover material during the formation of the cover.

The porous material used in some covers may be a woven fabric varying in porosity (open weave or tight weave as described by the number of ends and picks), type of weave (plain weave, twill weave, satin weave, and the like), yarn denier, yarn type (nylon, polyester, cotton, cellulose acetate, rayon, and the like, and blends thereof). The porous material may also be of a nonwoven type or spunbond type varying in polymer type (nylon, polyester, polyolefin, etc.), basis weight, and/or thickness.

Figure 4:
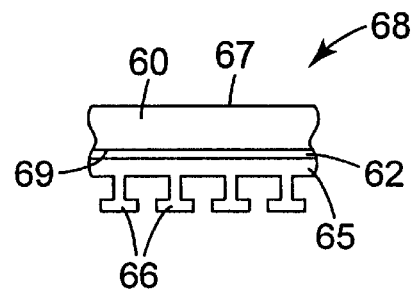
FIG. 4 is a schematic side view of another cover.

Another example of a cover is illustrated in FIG. 4. The cover 68 consists of a layer of cover material 60 comprising a polymer blend of the current invention. The layer of cover material 60 has a first surface 67 and an opposite second surface 69. The cover includes a layer of film 65 having an integral array of hook structures 66. Interposed between the layer of cover material 60 and the layer of film 65 is a layer of porous material 62. The topography of the first surface 67 of the layer of cover material depicts a flat surface, however, the topography of the first surface may consist of cylindrical stems or other shapes.

Figure 5:
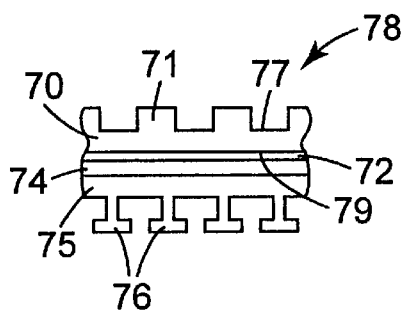
FIG. 5 is a schematic side view of another cover.

Another example of the cover is illustrated in FIG. 5. The cover 78 consists of a layer of cover material 70 comprising a polymer blend of the current invention. The layer of cover material 70 has a first surface 77 (defined by a plurality of surface stem structures 71) and an opposite second surface 79. The cover 78 includes a film layer 75 having an integral array of hook structures 76. Interposed between the first surface 77 of the layer of cover material 70 and the layer of film 75 is an adhesive layer 74 and a layer of porous material 72. The cover 70 illustrated in FIG. 5 is of the same construction as the cover illustrated in FIG. 3, except for the alteration in the topography of the first surface 77 thereon.

Figure 6:
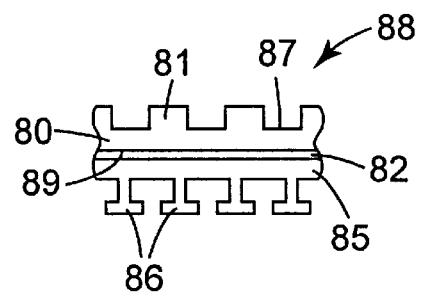
FIG. 6 is a schematic side view of another cover.

Another example of a cover is illustrated in FIG. 6. The cover 88 consists of a layer of cover material 80 comprising a polymer blend of the current invention. The layer of cover material 80 has a first surface 87 (defined by a plurality of upstanding surface stem structures 81) and an opposite second surface 89. The cover 88 includes a layer of film 85 having a integral array of hook structures 86. Interposed between the first surface 87 of the layer of cover material 80 and the film layer 85 is a layer of porous material 82. The cover 88 illustrated in FIG. 6 is of the same construction as the cover 68 illustrated in FIG. 4, except for the alteration in the topography of the first surface 87 thereon.

Figure 7:
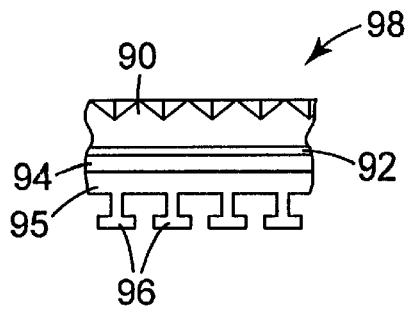
FIG. 7 is a schematic side view of another cover.

Another example of a cover is illustrated in FIG. 7. The cover 98 consists of a layer of cover material 90 comprising a polymer blend of the current invention. The layer of cover material 90 has a first surface 97 (defined by a prismatic topography) and an opposite second surface 99. The cover 98 includes a film layer 95 having an integral array of hook structures 96. Interposed between the first surface 97 of the layer of cover material 90 and the film layer 95 is an adhesive layer 94 and a layer of porous material 92. The cover 98 illustrated in FIG. 7 is of the same construction as the cover 58 illustrated in FIG. 3, except for the alteration in the topography of the first surface 97 thereof.

Figure 8:
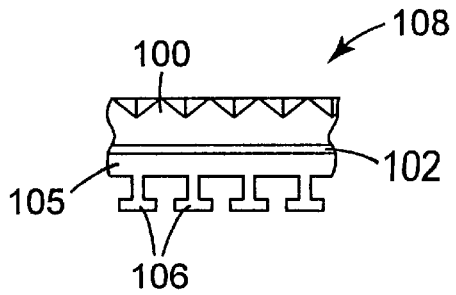
FIG. 8 is a schematic side view of another cover.

Another example of a cover is illustrated in FIG. 8. The cover 108 consists of a layer of cover material 100 comprising a polymer blend of the current invention. The layer of cover material 100 has a first surface 107 (defined by a prismatic topography) and an opposite second surface 109. The cover 108 includes a film layer 105 having an integral array of hook structures 106. Interposed between the first surface 107 of the layer of cover material 100 and the film layer 105 is a layer of porous material 102. The cover 108 illustrated in FIG. 8 is of the same construction as the cover 68 illustrated in FIG. 4, except for the alteration in the topography of the first surface 107 thereof.

Methods of Making a Roll Cover

Figure 10:
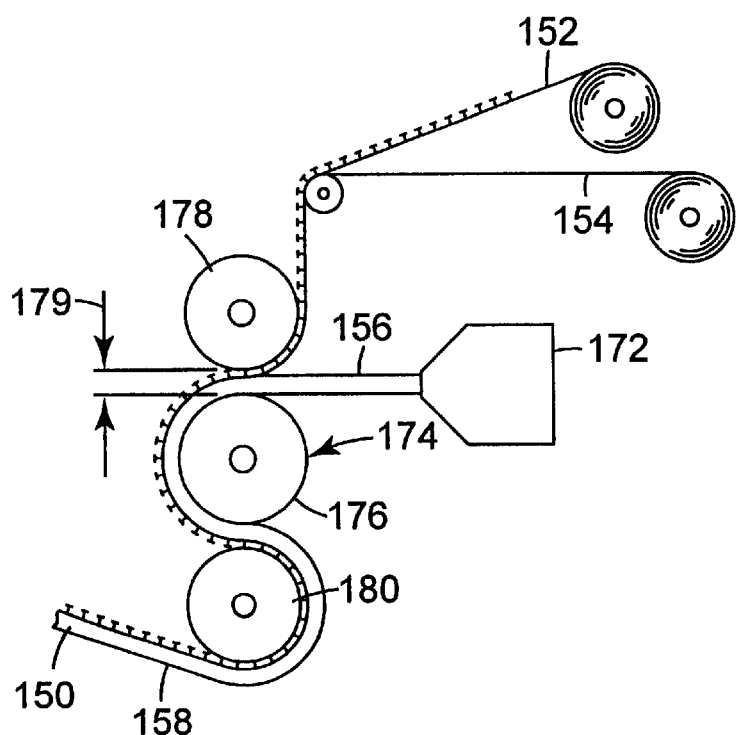

An inventive process for making the cover of the present invention is illustrated in FIG. 10. The finished product of this assembly is referenced as cover assembly 150, and is defined as a laminated assembly of preformed components, such as a film layer 152, a second porous material 154 and an outer layer of cover material 156. The layer of cover material 156 is in molten form during assembly, and as these three components 152, 154 and 156 are aligned and brought together, the layer of cover material 156 in part flows through the second porous material 154 into contact and direct bonding engagement with the film layer 152. These three components 152, 154 and 156 are brought together under the necessary process conditions to achieve sufficient direct coating and bonding and to also form a desired surface pattern on an exposed side of the layer of cover material 156 (which defines an exterior surface 158 of the cover assembly 150).

The cover material can be any suitable material, such as the materials defined above for the cover of the present invention or any suitable thermoplastic material such as a polymer or polymer blend. As long as the material 156 can be heated to a state in which it can be flowed and molded as assembled with the film layer 152 and second porous material 154, and ultimately provides the desired frictional engagement characteristics on its exterior surface 158, it is a suitable material for this purpose. It is also within the scope of this invention to use two or more different thermoplastic materials in either layered or blended form to define that portion of the cover assembly 150 which forms its exterior surface 158 and serves to bond the components of the cover assembly 150 together. The thermoplastic material may be a foamed or solid polymeric material. It is desirable to have compatible thermoplastic materials that have sufficient layer adhesion to keep the cover assembly together. Suitable materials include thermoplastic polyurethanes, polyvinyl chlorides, polyamides, polyimides, polyolefins (e.g., polyethylene and polypropylene), polyesters (e.g., polyethylene terephthalate), polystyrenes, nylons, acetals, block polymers (e.g., polystyrene materials with elastomeric segments, available from Shell Chemical Company of Houston, Tex., under the designation KRATON, polycarbonates, thermoplastic elastomers (e.g. polyolefin, polyester or nylon types) and copolymers and blends thereof. The thermoplastic material may also contain additives, including but not limited to fillers, fibers, antistatic agents, lubricants, wetting agents, foaming agents, surfactants, pigments, dyes, coupling agents, plasticizers, suspending agents and the like.

In the description of the aforementioned covers, the layer of cover material 156, once molded with its desired exterior surface and cooled, becomes the cover material 60, 80 or 100 illustrated in FIGS. 4, 6 and 8, respectively. Likewise, the film layer 152 corresponds to the layers 65, 85 and 105 illustrated in FIGS. 4, 6 and 8, respectively. Similarly, the second porous material 154 corresponds to the layer of porous material 62, 82 and 102 illustrated in FIGS. 4, 6 and 8, respectively. As noted above, the second porous material 154 may be a layer of fibrous material or fabric scrim which may be woven or nonwoven. It is essential that the porous material 154 allow sufficient molten thermoplastic material to flow through the porous material and into adhering contact with the film layer 152. The porous material serves to stabilize and reinforce the cover assembly 150, as well as resist stretching and improving tear resistance.

As noted above, the film layer 152 may be provided with an array of hook structures on one side. The film layer 152 has first and second major sides, with the first side (the side bearing such hook structures) being adapted for adherence to a substrate surface. The second side of the film layer 152 is the side presented for an adhering bond with the molten thermoplastic material 156. The first side of the film layer 152 may take on a number of different forms, depending upon how it is to be adhered to a substrate surface (e.g., it may be one part of a two-part mechanical fastener, it may bear a pressure-sensitive adhesive, etc.).

The inventive process for forming a cover assembly, as illustrated in FIG. 10, involves molding the exterior surface 158 of the cover. Such molding may define a desired topography on that exterior surface 158 as a substantially smooth surface, or as a surface having a plurality of upstanding surface stems such as illustrated in FIG. 6, a prismatic surface topography as illustrated in FIG. 8, a randomly textured surface topography such as illustrated in FIG. 1, or some other combination of smooth, randomly textured and uniformly textured topographies, or a surface topography having desired gradient of texture changes across the face thereof. The cover surface may have a topography with a random or nonrandom array of a shape or shapes thereon. This molding step may include any suitable molding apparatus, as known in the molding art. For example, the desired exterior surface 158 could be injection molded, molded by compressing a heated sheet member against a molding surface or molded by molding a flowable material over and into the cavities of a mold which may be stationary or moving (e.g., a belt, a tape or a rotating drum).

The process illustrated in FIG. 10 shows a three-roll vertical molding apparatus which includes an extruder and extrusion die 172 adapted for extruding a layer of molten thermoplastic material 156 into a mold 174. In this case, the mold 174 is a roll 176, which has, on its outer cylindrical surface, a desired surface pattern for transference to the molten thermoplastic material 156 as it passes over the cylindrical surface of the roll 176. If, for example, the desired exterior surface 158 is a plurality of stem structures 81 (such as in FIG. 6), the surface of the roll 176 would have a plurality of arranged cavities adapted to form a like plurality of surface stem structures from the molten material, such as shown in FIG. 9. The cavities may be arranged, sized and shaped as required to form a suitable surface stem structure from the flowable material. A sufficient additional quantity of molten thermoplastic material is extruded into the mold 174 to form not only the surface stem structures, but an underlying substrate layer of thermoplastic material to flow through the porous material 154 and into adhering contact with the second side of the film layer 152.

In the form shown in FIG. 10, the roll 176 (mold 174) is rotatable and forms a nip 179, along with an opposed roll 178. The nip between the roll 176 and opposed roll 178 assists in forcing the flow of molten thermoplastic material 156 into the cavities of the roll 176 and provides a uniform substrate layer thereon. The spacing of the gap forming the nip 179 between rolls 176 and 178 can be adjusted to assist the formation of a predetermined thickness of the substrate layer of thermoplastic material. In addition, the reinforcing porous material 154 and the film layer 152 are simultaneously brought into the nip 179 between the roll 176 and the opposed roll 178 to yield the cover assembly 150. The nip 179 is sized to provide suitable flow and pressure characteristics as the film layer 152 and porous material 154 and molten thermoplastic material 156 are advanced therethrough without destructively crushing the hook structures (or other adherence engagement structures) on the first side of the film layer 152. As illustrated in FIG. 10, the cover assembly 150 may traverse a third roll 180 after exiting the roll 176. In this process, the temperatures of all three rolls 174, 176 and 180 may be selectively controlled to achieve desired cooling of the thermoplastic material 156. The third roll 180 also serves to define the further path traversed by the cover assembly 150 as the exterior surface 158 is being formed thereon at the roll 176.

Figure 11:
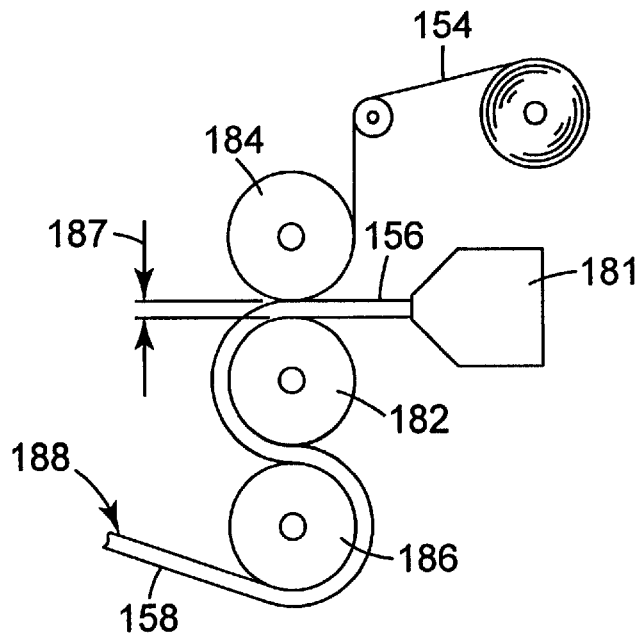
Figure 12:
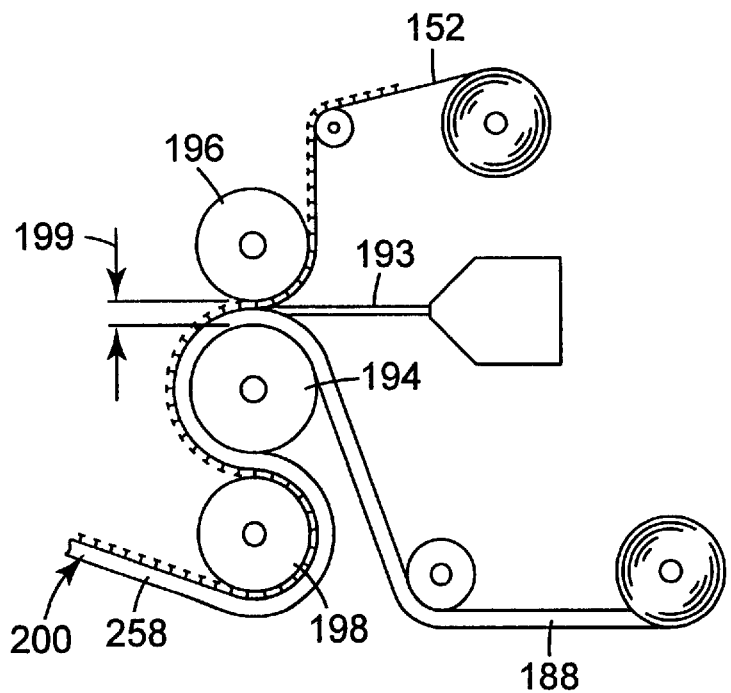

In an alternative embodiment of the inventive cover, a layer of adhesive is also included as part of the cover assembly (see, e.g., the adhesive layer 54, 74 and 94 in the covers of FIGS. 3, 5 and 7). A process for assembling cover assemblies such as illustrated in FIGS. 3, 5 and 7 is illustrated in FIGS. 11 and 12. FIG. 11 again illustrates a three-roll vertical molding apparatus having an extruder and extrusion die 181, a first roll 182, an opposed roll 184 and a third roll 186. The porous material 154 is aligned with the layer of molten thermoplastic material in the nip 187 defined between the roll 182 and opposed roll 184, and the layer of molten thermoplastic material 156 flows into and at least partially through the porous material 154 (while at the same time having its exterior surface 158 molded by the exterior surface of the roll 182) to form a laminate component 188.

A further lamination process is illustrated in FIG. 12. The laminate component 188 is bonded to the film layer 152 with an additional bonding agent (adhesive 193). This bonding and final lamination may be accomplished using a vertical three-roll assembly such as illustrated in FIG. 12 (having opposed rolls 194 and 196 with a third roll 198) or may be accomplished by other suitable laminate bonding techniques. Again, the components are preferably brought together in a nip 199 which permits component advancement under pressure but does not crush any adherence engagement structure on the first side of the film layer 152. The resultant cover assembly is a laminate having on one side the film layer 152 which is adapted to be adhered to a substrate and on its second side the exterior surface 158 of the molded thermoplastic material 156, with the porous material 154 and a layer of adhesive 193 lying therebetween (which corresponds to the adhesive layers 54, 74 and 94 in the inventive articles of FIGS. 3, 5 and 7). This resultant cover assembly is referenced as cover assembly 200 in FIG. 12 (and likewise corresponds to covers 58, 78 and 98 in FIGS. 3, 5 and 7, respectively).

An alternative method for making the inventive article of the present invention (specifically, the cover 48 illustrated in FIG. 2) involves using the process illustrated in FIGS. 11 and 12, but without the addition of the porous material 154 to the cover assembly. The layer of cover material 40 (FIG. 2) is formed by molding, such as by the means illustrated in FIG. 11, and the layer of cover material 40 (now a single component defining the laminated component 188) is adhered by adhesive 193 to the film layer 152 such as by means of the process illustrated in FIG. 12.

In yet another alternative embodiment of the present invention, a cover assembly may be formed by means of the process illustrated in FIG. 10, but without the porous material 154. In other words, the cover assembly 150 formed by the process of FIG. 10 would not have the porous material 154 therein, but the exterior surface 158 would be formed on the thermoplastic material 156 by the roll 176, and the thermoplastic material 156 would be in adhering and bonding contact with the film layer 152 (thereby forming a two-layer laminate composite cover). As can be readily appreciated, the process for making a cover assembly illustrated in FIG. 10 is less costly than the process for making a cover assembly illustrated in FIGS. 11 and 12 (the former process does not require the use of an additional component (adhesive), and its cover assembly can be formed in a single pass through a lamination apparatus, thereby resulting in less material handling time and labor involvement).

The mold 174 may be of the type used for either continuous processing (such as a tape, a cylindrical drum or a belt), or batch processing (such as an injection mold), although the former is preferred. When making a mold 174 for forming surface stems (e.g., stem structures 81 in FIG. 6), the cavities of the mold 174 may be formed in any suitable manner, such as by drilling, machining, laser drilling, water jet machining, casting, etching, die punching, diamond turning, engraving, knurling and the like. The placement of the cavities determines the spacing and orientation of the surface stem structures, and thus the inventive cover. The mold cavities can be open at the end of the cavity opposite the surface from which the molten thermoplastic material is applied to facilitate injection of the thermoplastic material into the cavity. If the cavity is closed, a vacuum can be applied to the cavity so that the molten thermoplastic material fills substantially the entire cavity. Alternatively, closed cavities can be longer than the lengths of the stem structures being formed so that the injected material can compress the air in the cavities. The mold cavities should be designed to facilitate release of the surface stem structures therefrom, and thus may include angled side walls, or a release coating (such as a Teflon material layer) on the cavity walls. The mold surface may also include a release coating thereon to facilitate release of the thermoplastic material substrate layer from the mold.

The mold can be made from suitable materials that are rigid or flexible. The mold components can be made of metal, steel, ceramic, polymeric materials (including both thermosetting and thermoplastic polymers) or combinations thereof. The materials forming the mold must have sufficient integrity and durability to withstand the thermal energy associated with the particular flowable thermoplastic material used to form the substrate layer and surface topographies. In addition, the material forming the mold preferably allows for the cavities to be formed by various methods, is inexpensive, has a long service life, consistently produces material of acceptable quality, and allows for variations in processing parameters.

The molten thermoplastic material is flowed into the mold cavity, and over the surface of the mold to form the layer of cover material. To facilitate flow of the molten thermoplastic material, the thermoplastic material typically must be heated to an appropriate temperature, and then coated into the cavities. This coating technique can be any conventional technique, such as calendar coating, cast coating, curtain coating, die coating, extrusion, gravure coating, knife coating, spray coating or the like. In the illustrative figures, a single extruder and extrusion die arrangement is shown. However, the use of two (or more) extruders and associated dies allows simultaneous extrusion into the nip of a plurality of thermoplastic materials to achieve a bi-component (layered or blended) laminate cover material.

The flow of the molten thermoplastic material 156 into the mold 174 may also be facilitated by the application of pressure between opposing rolls 178. The roll 174 and the opposing roll 178 may also be gapped to create a fixed spacing (nip) between the rolls. The opposing roll 178 may also be under pressure when such a gap is provided. When the porous material 154 is introduced into the nip so described, it may be advantageous to control the temperature of the opposing roll 178 so as to control the penetration of the molten thermoplastic material 156 through the porous material 154. In this fashion, the quantity of molten thermoplastic material 156 can be controlled to barely penetrate the surface coating of the porous material 154, and to penetrate the porous material on the opposite side of introduction of thermoplastic material 156 so as to almost encapsulate the porous material 154. The penetration of the molten thermoplastic material 156 into the porous material 154 may also be controlled by the temperature of the molten thermoplastic material 156, the quantity of thermoplastic material 156 in the nip itself, and/or by extruder flow rates in conjunction with takeaway speeds of the mold cavities if they are of the rotating type. In the embodiments of the invention wherein the film layer 152 has hook structures protruding from one side thereof, the gap between opposing rolls is also controlled to facilitate lamination of all components but without destructive crushing of the hook structures.

After the molten thermoplastic material has been coated into the mold cavities and over the mold surface, the thermoplastic material is cooled to solidify and form the desired exterior surface topography thereon (e.g., smooth, textured, surface stem structures, etc.). The solidified thermoplastic material is then separated from the mold. The thermoplastic material will often shrink when it is solidified, which facilitates release of the material (e.g., surface stem structures and substrate layer sheet) and integral film layer from the mold. Part or all of the mold may be cooled to aid in solidifying the surface stem structures and substrate layer sheet. Cooling can be effected by the use of water, forced air, heat transfer liquids or other cooling processes.

When thermosetting resins are used as the molten material, the resin is applied to the mold as a liquid in an uncured or unpolymerized state. After the resin has been coated onto the mold, it is polymerized or cured until the resin is solid. Generally, the polymerization process involves either a setting time, or exposure to an energy source, or both, to facilitate the polymerization. The energy source, if provided, can be heat or radiation energy such as an electron beam, ultraviolet light or visible light. After the resin is solidified, it is removed from the mold. In some instances, it may be desired to further polymerize or cure the thermosetting resin after the surface stem structures are removed from the mold. Examples of suitable thermosetting resins include melamine, formaldehyde resins, acrylate resins, epoxy resins, urethane resins and the like. The formation of a substrate layer sheet having upstanding stem structures on one side thereof is further detailed in pending U.S. Pat. Nos. 5,505,747 and 5,607,345 and which are incorporated by reference herein.

Traction Roll Covers

Figure 13:
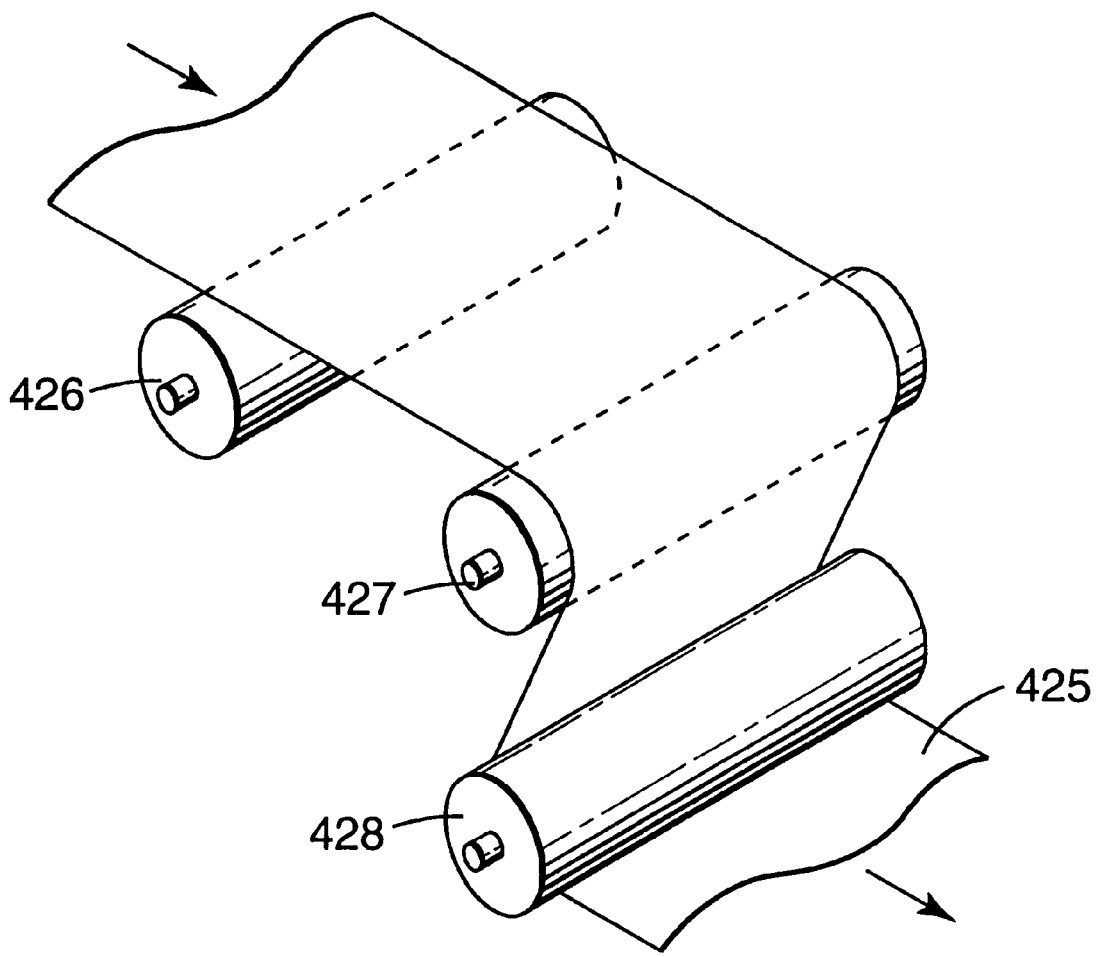

Covers specifically embodied by the invention pertain to selective engagement with an advancing web. In particular, the invention relates specifically to compositions and apparatus for covering rolls used to engage an advancing web. Most specifically, this invention relates to composition for such covers and their formation for use on pull rolls in the textile industry. FIG. 13 illustrates a textile or fabric web 425 being processed along a web travel path which is defined, at least in part, by textile pull rolls such as pull rolls 426, 427 and 428. Such rolls may be driven or idler rollers, depending upon the processing application. The surfaces of the rolls are coated or covered with materials having the desired frictional characteristics for the application and for the fabric web being processed. The pull rolls are intended to keep the fabric web taut and uniformly disposed as it is processed. In most pull roll applications, a high degree of friction is required between the pull roll and the fabric web to prevent slippage, keep the fabric web taut, and prevent damage to the fabric. As the shear and pulling forces of the fabric can be severe in the fabric forming process, maximization of the tensile properties of the polymer composition is important. In addition, roll coverings are typically used for extensive periods of time so resistance to abrasion of the roll covering is important to maximize the useful life of the roll covering before a change is required.

The cover assemblies disclosed herein are suitable for use as pull roll covers. Preferably, the cover assemblies are readily replaceable and repositionable, thus allowing quick changeover from one cover to another on a pull roll by a simple and efficient arrangement that results in low machine downtime. In one preferred embodiment, the cover assembly is secured to the pull roll by an opposed two-part mechanical fastener system (e.g., hook-and-loop fastener structures). Preferably, the loop material of such a fastener system is affixed around the cylindrical outer surface of the pull roll. The hook material used to secure the pull roll cover assembly to the pull roll projects from the back side of the cover assembly. For instance, in the case of the cover material shown in FIG. 6, the hook material consists of the hook structures 86.

Figure 14:
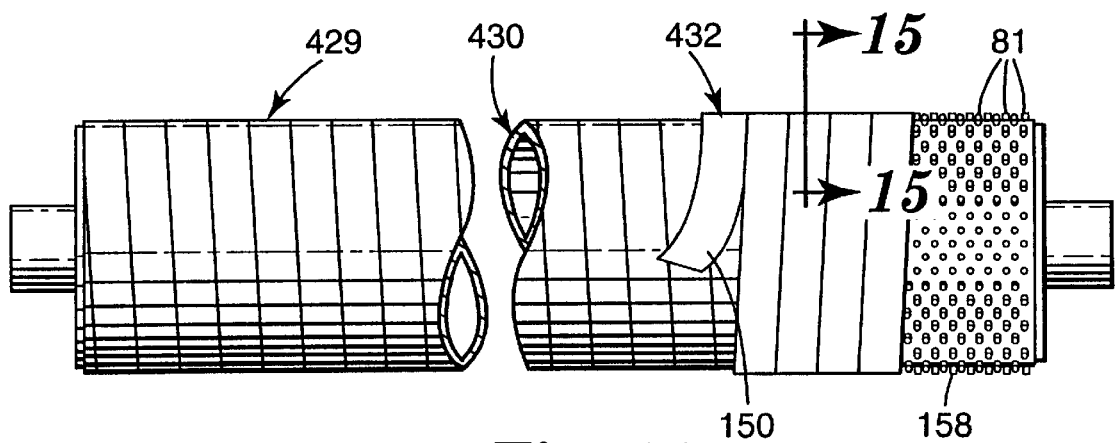

FIG. 14 illustrates a preferred application scheme for a cover on a pull roll. A strip of fastener material 429 has been previously applied helically about the cylindrical outer surface of a pull roll 430 and fixedly secured thereto. A pull roll cover 432 is formed by helically wrapping a flexible strip of cover assembly material (e.g., cover 88, FIG. 6) about the loop fastener structure 429 and can be oppositely wound relative to the winding of the loop fastener structure 429, if desired. In the pull roll cover 432 illustrated in FIG. 14, the exterior surface 158 is defined by a plurality of surface stem structures 81.

Figure 15:
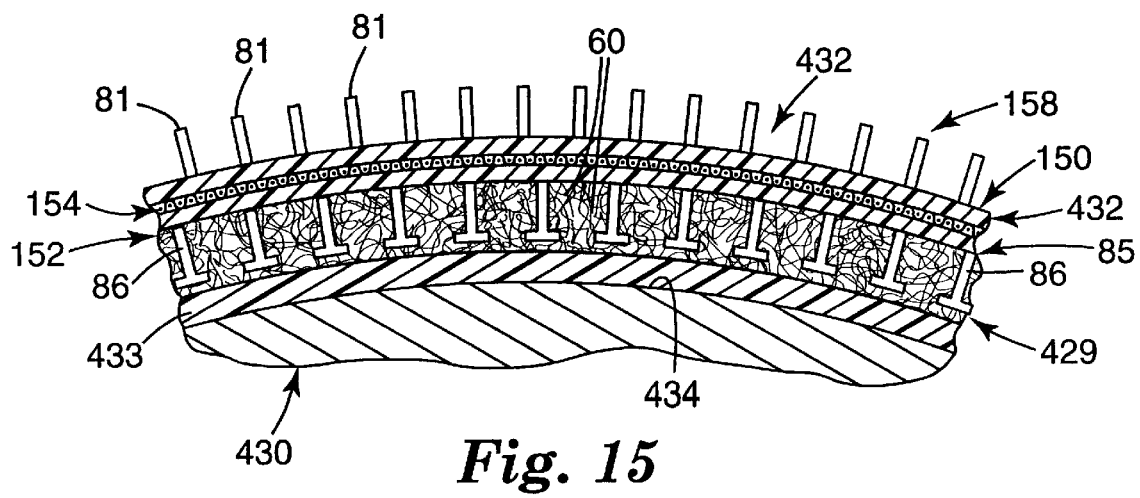

FIG. 15 illustrates, in more detail, the nature of the pull roll cover 432 and its mounting to pull roll 430 (which has a backing substrate sheet 433 of the loop structure material 429 adhered to its cylindrical outer surface 434). The pull roll cover 432 has its exterior surface 158 defined by the surface stem structures 81 projecting outwardly from a substrate layer sheet 435, with outer ends of the surface stem structures 81 defining a cylindrical textile engaging surface of the pull roll 430. On its opposite side, the pull roll cover 432 has means for hooking the loop structure material 429. This hooking means is provided by the film layer 152, which in FIG. 6 is illustrated as the film layer 85 of hook structures 86, with the hook structures 86 designed for inter-engagement with the looped and intermingled hook engaging filaments of the loop structure material 429.

The cover assembly 150, which in combined strip form comprises the pull roll cover 432 illustrated in FIG. 15, was formed using the inventive method illustrated in FIG. 10, but with a surface stem structure molding pattern like that of FIG. 9 on the surface of the casting roll 176. Hence, a porous material 154 is embedded in the substrate layer sheet 435. During formation of the cover assembly 150, the molten thermoplastic material flows through the porous material 154 and into bonding contact with the film layer 85 (film layer 152). Further details regarding the assembly of pull roll covers and the means for bonding such cover assemblies to a pull roll are disclosed in U.S. application Ser. No. 08/939,726, filed Oct. 3, 1997 which is incorporated by reference herein.

EXAMPLES

Examples of Methods for Forming Covers

As noted above, there are various methods contemplated for formation of the inventive cover. Several specific cover formulation and lamination techniques are outlined in the method examples detailed below. In these examples, the thermoplastic materials were formed from various blends of the materials set forth in Table 1. These blends are detailed in Table A, by individual component weight percent for each composition mix.

TABLE 1

| Identification | Polymer | Manufacturer | Location | Description |
| --- | --- | --- | --- | --- |
| Polymer A | KRATON G1657 | Shell Chemical Company | Houston, Texas | Styrene-Ethylene-Butylene-Styrene (SEBS) Block Copolymer |
| Polymer B | REXFLEX FPO W101, Formerly REXFLEX D100 | Rexene Products Company | Dallas, Texas | Flexible Polypropylene |
| Polymer C | REXFLEX FPO W108, Formerly REXFLEX D1720 | Rexene Products Company | Dallas, Texas | Flexible Polypropylene |
| Polymer D | ESCORENE PP3445 | Exxon Chemical Company | Baytown, Texas | Polypropylene |
| Polymer E | SRD7-587, Formerly SRD7-560 | Union Carbide | Danbury, Connecticut | Impact Copolymer |
| Polymer F | VISTAFLEX 9601-74 | Advanced Elastomer Systems, L.P. | St. Louis, Missouri | Ethylene-propylene terpolymer |
| Polymer G | PROFAX 6523F | Montell USA Inc. | Wilmington, Delaware | Polypropylene |
| Polymer H | HYTREL 3076 | E.I. duPont de Nemours and Company | Wilmington, Delaware | Polyester Elastomer |
| Polymer I | PELLETHAN E 2103-70A | Dow Chemical Company | Midland, Michigan | Polyether Polyurethane |
| Polymer J | HYTREL 5526 | E.I. duPont de Nemours and Company | Wilmington, Delaware | Polyester Elastomer |
| Polymer K | Pigment 63700 PP | ReedSpectrum | Minneapolis, Minnesota | Blue Pigment |
| Polymer L | Pigment 63696 PP | ReedSpectrum | Minneapolis, Minnesota | Green Pigment |
| Polymer M | Pigment 55328 TPR | ReedSpectrum | Minneapolis, Minnesota | Blue Pigment |
| Polymer N | KRATON D1119 | Shell Chemical Company | Houston, Texas | Styrene-Isoprene-Styrene (SIS) Block Copolymer |
| Polymer O | WINGTACK 95 | Goodyear Tire and Rubber Company | Akron, Ohio | Hydrocarbon Resin |
| Polymer P | Pigment 58129 PP | ReedSpectrum | Minneapolis, Minnesota | Yellow Pigment |
| Polymer Q | Pigment 34783 EVA | ReedSpectrum | Minneapolis, Minnesota | Yellow Pigment |
| Polymer R | Pigment 41004 EVA | ReedSpectrum | Minneapolis, Minnesota | Blue Pigment |
| Polymer S | Pigment 55327 TPR | ReedSpectrum | Minneapolis, Minnesota | Green Pigment |
| Polymer T | KRATON G1726 | Shell Chemical Company | Houston, Texas | Styrene-Ethylene-Butylene-Styrene (SEBS) Block Copolymer |
| Polymer U | KS084P | Montell USA | Wilmington, | Polypropylene- |

TABLE 1-continued

| Identification | Polymer | Manufacturer | Location | Description |
|---|---|---|---|---|
| | | Inc. | Delaware | CATALLOY process |
| Polymer V | KS075 | Montell USA Inc. | Wilmington, Delaware | Polypropylene-CATALLOY process |

TABLE A

| MIX | Component 1 | Wt. % | Component 2 | Wt. % | Component 3 | Wt. % | Component 4 | Wt. % |
|---|---|---|---|---|---|---|---|---|
| I | A | 49 | B | 48 | L | 3 | | |
| II | A | 49 | B | 48 | K | 3 | | |
| III | F | 86.7 | G | 9.3 | S | 4 | | |
| IV | F | 83 | D | 9.5 | M | 7.5 | | |
| V | N | 55 | O | 45 | | | | |
| VI | A | 46.7 | B | 45.8 | P | 7.5 | | |
| VII | A | 49 | B | 48 | Q | 1.5 | R | 1.5 |

Method Example M1 (direct bond)

A cover, such as cover 68 in FIG. 4, was formed using a process and apparatus such as illustrated in FIG. 10. The top and bottom rolls of a vertical stack of three temperature-controlled co-rotating 5-inch diameter (12.70 cm) cylindrical rolls on a vertical three roll casting station made by Killion Extruders, Inc. of Cedar Grove, N.J., were polished, chrome plated steel while the center roll was a plasma coated steel roll (type PC-471 finish, applied by Plasma Coatings, Inc. of Bloomington, Minnesota). The top roll was temperature controlled to 140° F., the middle roll to 44° F. and the bottom roll to 42° F.

An 8-inch wide molten sheet of mix composition I was extruded at 425° F. from a dual manifold sheet die that was fed by an 1½ inch single-screw extruder (from Johnson Plastic Machinery, Chippewa Falls, Wis.), having an L/D of 29/1 and operating at 104 rpm and a 1 inch Killion single-screw extruder, having an L/D of 24/1 and operating at 49 rpm. All ingredients of mix I were in pellet form. A dusting of calcium carbonate (about 0.5 percent by weight) was applied to the mix during mixing in a Marion mixer (from Marion Mixers, Inc., Marion, Iowa.) as an antiblocking agent for ingredient B. The Johnson extruder had a temperature profile ranging from 350° F. at the feed zone to 425° F. at the discharge zone, with adapter temperatures at 425° F. The Killion extruder had a temperature profile ranging from 375° F. at the feed zone to 425° F. at the discharge zone, with adapter temperatures at 425° F. Both screws were of a general purpose single flight design. The die temperature was 425° F. Both extruders were operated in tandem solely to increase capacity (or line speed).

The molten sheet was introduced into the nip between the top and middle roll of the vertical stack of the three temperature-controlled co-rotating 5-inch diameter (12.70 cm) cylindrical rolls that were rotating at 4 feet per minute. The top and middle rolls were gapped at about 0.065 inch. A hook structure film was simultaneously introduced into the nip of the top and middle roll of the vertical stack, the hook side of the film contacting the top chrome plated steel roll for about a 90° wrap and rotated into the nip. The hook structure film has a relatively low profile, and is formed from hook stem materials such as those disclosed in Melbye et al. U.S. Pat. No. 5,077,870 and U.S. Pat. Nos. 5,505,747 and 5,607,345 (which are incorporated by reference herein). One version of such material is the 3M Mechanical Fastener Diaper Closure System (available from Minnesota Mining and Manufacturing Company, St. Paul, Minn.). In this example, the hook structure film was formed with the following characteristics: stem height=approximately 0.020 inches, stem diameter=0.016 inches, head diameter=0.030 inches, stem spacing=0.055 inches, and stem density=325 stems per inch$^2$. The hook stems are formed integrally with a substrate layer sheet (which is 4.5 to 5 mil thick) from polymer E in Table 1. A fabric scrim available from Milliken & Company, Spartanburg, S.C., style #924856 (32×28, ends×picks; 65/35 cotton polyester blended warp and fill) was also simultaneously introduced into the nip of the top and middle rolls of the vertical stack, the fabric contacting the smooth side of the previously mentioned hook structure film for about a 90° wrap and hence also rotated into the nip.

As the hook structure film and fabric scrim were rotated into the nip, some of the molten polymer of mix I penetrated through the scrim and durably melt bonded to the hook structure film. As the molten sheet was solidified by the chilled roll surfaces, the top roll released the laminated sheet to follow the middle roll to the bottom roll. The quenched sheet thus had a molded pattern derived from the plasma pattern of the middle roll thereon, and was subsequently stripped away from the bottom roll to give one embodiment of the current invention having high friction, durable surface with an integral bonded hook structure film to allow attachment to a suitable mating surface. The thickness of the cover assembly was about 0.093 inch. The resultant cover assembly is illustrated in FIG. 4.

Method Example M2 (direct bond)

Figure 16:
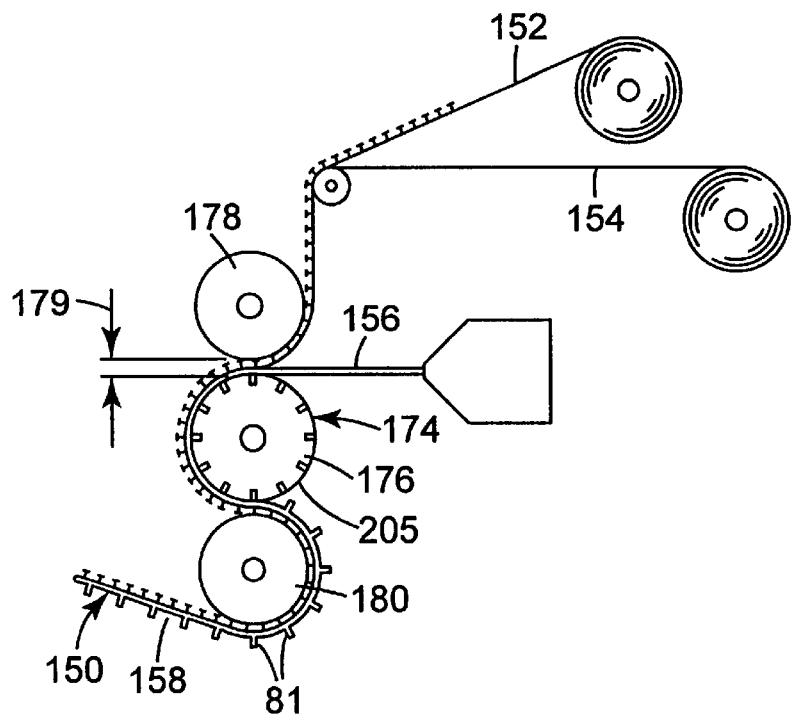

This example was prepared in the same fashion as Method Example M1 except for the following. A patterned roll having the pattern shown in FIG. 9 was used in place of the plasma coated roll. This process is illustrated in FIG. 16, which is identical with the process of FIG. 10 except for the surface of the mold 174. In this case, mold 174 is still a roll 176, but the roll has a pattern forming surface 205 which serves to define a plurality of stem structures 81 as the exterior surface 158 of the inventive cover of FIG. 6.

The pattern was drilled into an aluminum sleeve 5.0 inches in diameter and a having a wall thickness of 0.300 inch that was designed to fit a reduced diameter temperature controlled middle roll mandrel for the previously described Killion three roll vertical casting station. The holes were 0.062 inch in diameter and 0.125 inch deep with a cross web spacing A=0.100 inch and a machine direction spacing B=0.100 inch. The cross web holes were offset by a spacing C=0.050 inch from each neighboring row of cross web holes. An 8-inch wide molten sheet of mix composition II was extruded at 425° F. from a dual manifold sheet die but only fed from a single manifold by an 1½ inch Johnson single-screw extruder, having an L/D of 29/1 and operating at 133 rpm. All ingredients of mix II were in pellet form. A dusting of calcium carbonate (about 0.5 percent by weight) was applied to the mix during mixing in a Marion mixer as an antiblocking agent for ingredient B. The Johnson extruder had a temperature profile ranging from 330° F. at the feed zone to 425° F. at the discharge zone, with adapter temperatures at 425° F. The screw was of a general purpose single flight design. The die temperature was 425° F. The top roll was temperature controlled to 140° F., the middle roll to 44° F. and the bottom roll to 70° F. The top and middle rolls were gapped at 0.056 inch and all rolls were rotating at 6.4 feet per minute. The thickness of the cover assembly was about 0.107 inch thick with the stem structures protruding about 0.045 inch of this dimension. The resultant cover assembly is illustrated in FIG. 6.

Method Example M3 (direct bond)

This example was prepared in the same fashion as Method Example M2 (FIG. 16) except for the following. An 8-inch wide molten sheet of mix composition IV was extruded at 475° F. from a dual manifold sheet die but only fed from a single manifold by an 1½ inch Johnson single-screw extruder, having an L/D of 29/1 and operating at 85 rpm. All ingredients of mix IV were in pellet form. The Johnson extruder had a temperature profile ranging from 400° F. at the feed zone to 475° F. at the discharge zone, with adapter temperatures at 475° F. The screw was of a general purpose single flight design. The die temperature was 475° F. The top roll was temperature controlled to 140° F., the middle roll to 44° F. and the bottom roll to 50° F. The top and middle rolls were gapped at 0.056 inch and all rolls were rotating at 4.4 feet per minute. The thickness of the cover assembly was about 0.105 inch thick with the stem structures protruding about 0.055 inch of this dimension. The resulting cover assembly is illustrated in FIG. 6.

Method Example M4 (direct bond)

This example was prepared in the same fashion as Method Example M1 (FIG. 10) except for the following. An 8-inch wide molten sheet of polymer H was extruded at 425° F. from a dual manifold sheet die that was fed by an 1½ inch Johnson single-screw extruder, having an L/D of 29/1 and operating at 51 rpm and a 1 inch Killion single-screw extruder, having an L/D of 24/1 and operating at 11 rpm. Polymer H was in pellet form. The Johnson extruder had a temperature profile ranging from 370° F. at the feed zone to 425° F. at the discharge zone, with adapter temperatures at 425° F. The Killion extruder had a temperature profile ranging from 350° F. at the feed zone to 425° F. at the discharge zone, with adapter temperatures at 425° F. Both screws were of a general purpose single flight design. The die temperature was 425° F. The top roll was temperature controlled to 160° F., the middle roll to 75° F. and the bottom roll to 75° F. The top and middle rolls were gapped at 0.047 inch and all rolls were rotating at 7.3 feet per minute. The stem structures were previously fabricated from polymer J rather than polymer E to ensure compatibility between the cover material and film layer. The backing thickness of the film layer was 0.032 inch while the stem structures projected 0.024 inch from the film surface. The thickness of the cover assembly was about 0.062 inch.

Method Example M5 (direct bond)

This example was prepared in the same fashion as Method Example M1 (FIG. 10) except for the following. A patterned roll having a knurled surface pattern was used in place of the plasma coated roll. The pattern (diamond pattern, 14 pitch coarse knurl) was knurled into an aluminum sleeve 5.0 inch in diameter and having a wall thickness of 0.300 inch that was designed to fit a reduced diameter temperature controlled middle roll mandrel for the previously described Killion three roll vertical casting station. The diamond-shaped knurls were about 0.060 inch long by 0.033 inch wide and 0.010 inch deep. An 8-inch wide molten sheet of mix composition VII was extruded at 475° F. from a dual manifold sheet die but only fed from a single manifold by an 1½ inch Johnson single-screw extruder, having an L/D of 29/1 and operating at 113 rpm. All ingredients of mix VII were in pellet form. A dusting of calcium carbonate (about 0.5 percent by weight) was applied to the mix during mixing in a Marion mixer as an antiblocking agent for ingredient B. The Johnson extruder had a temperature profile ranging from 250° F. at the feed zone to 475° F. at the discharge zone, with adapter temperatures at 475° F. The screw was a general purpose single flight design. The die temperature was 475° F. The top roll was temperature controlled to 180° F., the middle roll to 90° F. and the bottom roll to 70° F. The top and middle rolls were gapped at 0.054 inch and all rolls were rotating at 4 feet per minute. The thickness of the cover assembly was about 0.051 inch thick. The resulting cover assembly is illustrated in FIG. 8.

Method Example M6 (direct bond)

Figure 17:
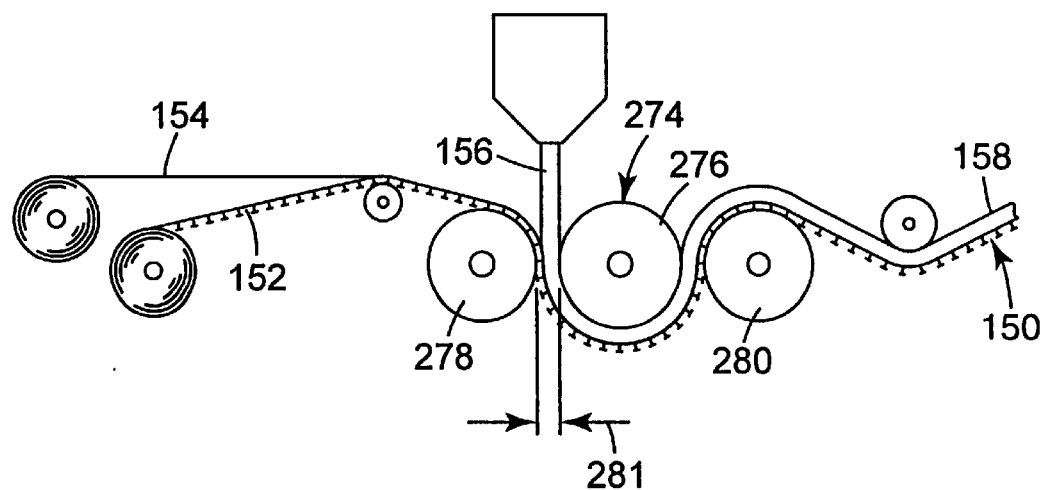

In this example, a horizontal three-roll casting station is employed for laminate formation. The horizontal casting station, illustrated in FIG. 17, has a mold 274 (center casting roll 276), upstream opposed roll 278 and downstream third roll 280. An extruder and extrusion die 272 is adapted to extrude thermoplastic material 156 into a nip 281 defined between the casting roll 276 and opposed roll 278. Simultaneously, the film layer 152 (illustrated as a hook structure film) and the porous material 154 (fabric scrim) are also inserted into the nip 281 between roll 276 and opposed roll 278. The upstream and downstream rolls of this horizontal stack of three temperature-controlled co-rotating 8-inch diameter cylindrical rolls on a horizontal three roll casting station were smooth steel while the center casting roll was a plasma-coated steel roll (type PC-471 finish, applied by Plasma Coatings, Inc.). The upstream roll was temperature controlled to 90° F., the center roll to 55° F. and the downstream roll to 55° F. A 26 inch wide molten sheet of mix composition III was extruded at 485° F. from a sheet die that was fed by a 2½ inch Johnson single screw extruder, having an L/D of 32/1 and operating at 139 rpm. Mix composition III was fed to the extruder with a proportional gravimetric feed system (manufactured by K-Tron, Pitman, N.J.) at a rate of 222 lb/hr. A dusting of calcium carbonate (about 0.5 percent by weight) was applied to component B during mixing in a marion mixer to act as an antiblocking agent for the said component. The Johnson extruder had a temperature profile ranging from 354° F. at the feed zone to 471° F. at the discharge zone, with adapter temperatures at 482° F. The die temperature was 485° F.

The molten sheet was introduced into the nip 281 between the upstream roll 278 and center casting roll 276 of the horizontal casting station that were rotating at 7 feet per minute. The upstream roll and center casting rolls were gapped at 0.061. The same hook structure film as detailed in Method Example M1 was simultaneously introduced into the nip of the upstream roll and center casting roll of the horizontal casting station, with the hook side of the film contacting the upstream smooth steel roll for about a 90° wrap and rotated into the nip. A fabric scrim, Milliken style #924856 (32×28, ends×picks; 65/35 cotton polyester blended warp and fill) was also simultaneously introduced into the nip of the upstream roll and center casting roll of the horizontal casting station, with the fabric contacting the smooth side of the previously mentioned hook structure film for about a 90° wrap and hence also rotated into the nip.

As the hook structure film and fabric scrim were rotated into the nip, some of the molten polymer of mix III penetrated through the scrim and durably melt bonded to the hook structure film. As the molten sheet was solidified by the chilled roll surfaces, the upstream roll released the laminated sheet to follow the center casting roll to the downstream roll for about a 180° wrap. The cover assembly thus had a molded pattern derived from the plasma pattern of the center casting roll thereon, and was subsequently stripped away from the downstream roll to provide one embodiment of the current invention having a high friction, durable surface with an integral bonded hook structure film to allow attachment to a suitable mating surface. The thickness of the composite laminate was about 0.093 inch. The resulting cover assembly is illustrated in FIG. 4.

Method Example M7 (adhesive bond)

The process for this example is illustrated in FIGS. 11 and 12. In FIG. 11, the top and bottom rolls of a vertical stack of three temperature-controlled co-rotating 5-inch diameter (12.70 cm) cylindrical rolls on a vertical three roll casting station made by Killion were polished, chrome plated steel while the center roll was a plasma coated steel roll (type PC-471 finish, applied by Plasma Coatings, Inc.). The top roll was temperature controlled to 90° F., the middle roll to 46° F. and the bottom roll to 43° F.

An 8-inch wide molten sheet of mix composition I was extruded at 475° F. from a dual manifold sheet die that was fed by an 1½ inch Johnson single-screw extruder, having an L/D of 29/1 and operating at 186 rpm and a 1 inch Killion single-screw extruder, having an L/D of 24/1 and operating at 107 rpm. All ingredients of mix I were in pellet form. A dusting of calcium carbonate (about 0.5 percent by weight) was applied to the mix during mixing in a Marion mixer as an antiblocking agent for ingredient B. The Johnson extruder had a temperature profile ranging from 400° F. at the feed zone to 475° F. at the discharge zone, with adapter temperatures at 475° F. The Killion extruder had a temperature profile ranging from 400° F. at the feed zone to 475° F. at the discharge zone, with adapter temperatures at 475° F. Both screws were of a general purpose, single flight design. The die temperature was 475° F. Both extruders were operated in tandem solely to increase capacity (or line speed).

The molten sheet was introduced into the nip between the top and middle rolls of the vertical stack of the three temperature-controlled co-rotating 5-inch diameter (12.70 cm) cylindrical rolls that were rotating at 9 feet per minute. The top and middle rolls were gapped at 0.055 inch. A fabric scrim, Milliken style #924856 (32×28, ends×picks; 65/35 cotton polyester blended warp and fill) was simultaneously introduced into the nip of the top and middle rolls of the vertical stack, the fabric contacting the top chrome plated steel roll for about a 90° wrap and hence rotated into the nip. As the fabric scrim was rotated into the nip, some of the molten polymer of mix I penetrated the scrim through the fabric interstices further enhancing the adhesion the polymer to the fabric scrim. As the molten sheet was solidified by the chilled roll surfaces, the top roll released the laminate component sheet 188 (FIG. 11) to follow the middle roll to the bottom roll and the quenched laminate component sheet (having a molded pattern derived from the plasma pattern of the middle roll) and the embedded fabric scrim on the opposite side were subsequently stripped away from the bottom roll. The laminate component sheet was about 0.060 inch thick.

In a secondary operation illustrated in FIG. 12, the above described laminate component sheet was melt bonded to the same hook structure film detailed in Method Example M1 using a hot melt adhesive (adhesive 193) of mix composition V to give one embodiment of the current invention having a high friction, durable surface with an integral bonded hook structure film to allow attachment to a suitable mating surface. This was accomplished by using the same three roll vertical stack of controlled temperature rolls, this time all rolls being chrome plated steel with all rolls being temperature controlled to 70° F. An 8-inch wide molten sheet of mix composition V was extruded at 325° F. from an 8 inch sheet die that was fed by a C. W. Brabender laboratory conical twin screw extruder (available from C. W. Brabender Instruments, Inc., South Hackensack, N.J., model type CTSE-V) operating at 212 rpm. Mix composition V was fed to the twin screw with an AccuRate, Inc., Whitewater, Wisconsin, dry material feeder using a ¾ inch helical wire screw at a rate of 16.5 lb/hr. The twin screw extruder had a temperature profile ranging from 212° F. at the feed zone to 284° F. at the discharge zone, with adapter temperatures at 325° F. The die temperature was 325° F. The molten sheet was introduced into the nip between the top and middle roll of the vertical stack of the three temperature-controlled co-rotating 5-inch diameter (12.70 cm) cylindrical rolls that were rotating at 9 feet per minute. The top and middle rolls were gapped at about 0.100 inch. The hook structure film was simultaneously introduced into the nip of the top and middle rolls of the vertical stack, with the hook structure side of the film contacting the top chrome plated steel roll for about a 90° wrap and rotated into the nip. The previously described laminate component sheet containing the fabric scrim was also simultaneously introduced into the nip of the top and middle rolls of the vertical stack, with the smooth side of the laminate component sheet contacting the middle chrome plated steel roll for about a 90° wrap and also rotated into the nip. As the hook structure film and laminate component sheet were rotated into the nip, sandwiching and contacting the adhesive layer, the resultant cover assembly was adhesively melt bonded. As the adhesive layer cooled and solidified, the top roll released the cover assembly to follow the middle roll to the bottom roll, and then the quenched cover assembly was stripped away from the bottom roll. The adhesive film layer of composition V was estimated to be about 0.007 inch thick, the overall thickness of the cover assembly was about 0.088 inch thick. The resulting cover assembly is illustrated in FIG. 3.

Method Example M8 (adhesive bond)

Figure 18:
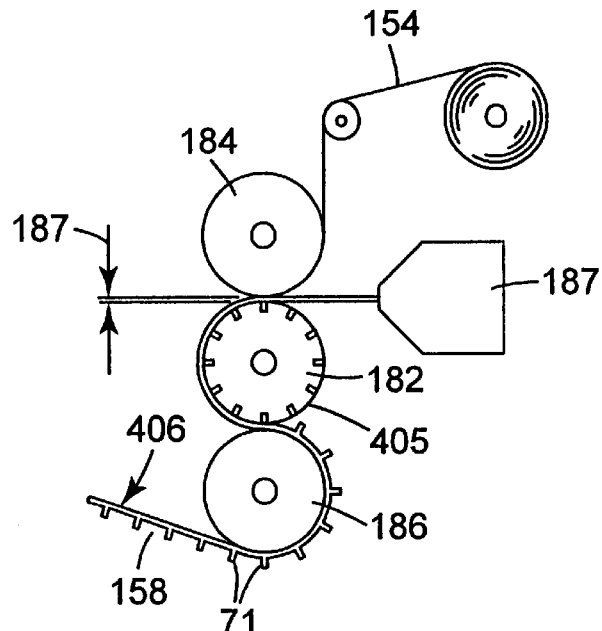

This example was prepared in the same fashion as Method Example M7 except for the following. A patterned roll having the pattern shown in FIG. 9 was used in place of the plasma coated roll. This portion of the process is illustrated by FIG. 18, which is otherwise the same as FIG. 11 except that the mold 374 (roll 376) has a topography 405 thereon for forming a plurality of surface stem structures 70 (see FIG. 5).

The pattern was drilled into an aluminum sleeve 5.0 inch in diameter and having a wall thickness of 0.300 inch that was designed to fit a reduced diameter temperature controlled middle roll mandrel for the previously described Killion three roll vertical casting station. The holes were 0.062 inch in diameter and 0.125 inch deep with a cross web spacing of 0.100 inch and a machine direction spacing of 0.100 inch. The cross web holes were offset 0.050 inch from each neighboring row of cross web holes. An 8-inch wide molten sheet of mix composition II was extruded at 390° from a dual manifold sheet die that was fed by an 1½ inch Johnson single-screw extruder, having an L/D of 29/1 and operating at 65 rpm and a 1 inch Killion single-screw extruder, having an L/D of 24/1 and operating at 85 rpm. All ingredients of mix II were in pellet form. A dusting of calcium carbonate (about 0.5 percent by weight) was applied to the mix during mixing in a Marion mixer as an antiblocking agent for ingredient B. The Johnson extruder had a temperature profile ranging from 300° F. at the feed zone to 390° F. at the discharge zone, with adapter temperatures at 390° F. The Killion extruder had a temperature profile ranging from 375° F. at the feed zone to 425° F. at the discharge zone, with adapter temperatures at 390° F. Both screws were of a general purpose single flight design. The die temperature was 390° F. The top roll was temperature controlled to 170° F., the middle roll to 44° F. and the bottom roll to 70° F. The top and middle rolls were gapped at 0.030 inch and all rolls were rotating at 5 feet per minute. The thickness of the laminate component sheet (referenced as laminate component sheet 406 in FIG. 18) was about 0.078 inch thick, with the pins protruding about 0.048 inch of this dimension.

Figure 19:
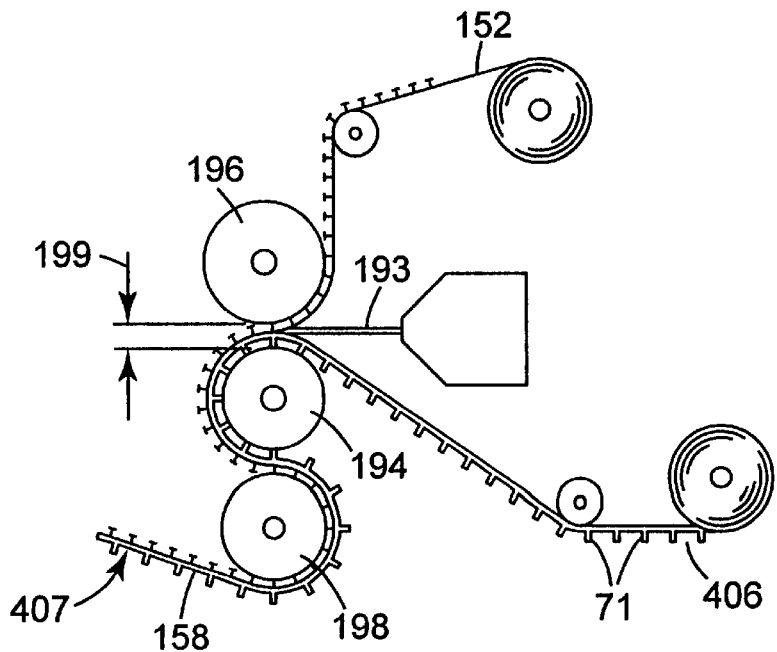
FIG. 19 is a schematic illustration of an apparatus and process for finalizing the formation of the alternative cover of the present invention partially formed in FIG. 18.

FIG. 19 illustrates the second phase of this processing method. In a fashion similar to that described in Method Example M7, this laminate component sheet 406 was in turn adhesively melt bonded to the same hook structure film (sheet 152) as detailed in Method Example M1 using a molten sheet of mix composition V fed by a Brabender laboratory conical extruder operating at 325° F. and 212 rpm. Mix composition V was fed to the twin screw with an AccuRate dry material feeder using a ¾ inch helical wire screw at a rate of 16.5 lb/hr. The twin screw extruder had a temperature profile ranging from 212° F. at the feed zone to 284° F. at the discharge zone, with adapter temperatures at 325° F. The die temperature was 325° F. The lamination process was accomplished by using the same three roll vertical stack of controlled temperature rolls, this time all rolls being polished chrome plated steel with all rolls being temperature controlled to 70° F. The top and middle rolls were gapped at about 0.1 05 inch and all rolls were rotating at 9 feet per minute. The adhesive film layer of composition V was estimated to be about 0.007 inch thick, the overall thickness of the composite was about 0.110 inch thick. The resulting cover assembly is referenced in FIG. 19 as laminate assembly 407, and is more specifically illustrated in FIG. 5.

Method Example M9 (adhesive bond)

This example was prepared in the same fashion as Method Example M7 (FIGS. 11 and 12) except for the following. A patterned roll having a knurled surface pattern was used in place of the plasma coated roll 176 in FIG. 11. The pattern (diamond pattern, 14 pitch coarse knurl) was knurled into an aluminum sleeve 5.0 inches in diameter and having a wall thickness of 0.300 inch that was designed to fit a reduced diameter temperature controlled middle roll mandrel for the previously described Killion three roll vertical casting station. The diamond shaped knurls were about 0.060 inch long by about 0.033 inch wide and about 0.010 inch deep.

An 8-inch wide molten sheet of mix composition I was extruded at 475° F. from a dual manifold sheet die that was fed by an 1½ inch Johnson single-screw extruder, having an L/D of 29/1 and operating at 184 rpm and a 1 inch Killion single-screw extruder, having an L/D of 24/1 and operating at 88 r.p.m. All ingredients of mix I were in pellet form. A dusting of calcium carbonate (about 0.5 percent by weight) was applied to the mix during mixing in a Marion mixer as an antiblocking agent for ingredient B. The Johnson extruder had a temperature profile ranging from 400° F. at the feed zone to 475° F. at the discharge zone, with adapter temperatures at 475° F. The Killion extruder had a temperature profile ranging from 400° F. at the feed zone to 475° F. at the discharge zone, with adapter temperatures at 475° F. Both screws were of a general purpose single flight design. The die temperature was 475° F. The top roll was temperature controlled to 90° F., the middle roll to 45° F. and the bottom roll to 45° F. The top and middle rolls were gapped at 0.061 inch and all rolls were rotating at 9 feet per minute. The thickness of the laminate component sheet having knurled topography was about 0.060 inch thick.

In a fashion similar to that described in Method Example M7, this laminate component sheet was in turn adhesive melt bonded to a hook structure film (the same hook structure film as detailed in Method Example M1) using a molten sheet of mix composition V fed by a Brabender laboratory conical twin screw extruder operating at 325° F. and 212 rpm. Mix composition V was fed to the twin screw with an AccuRate dry material feeder using a ¾ inch helical wire screw at a rate of 16.5 lb/hr. The twin screw extruder had a temperature profile ranging from 212° F. at the feed zone to 284° F. at the discharge zone, with adapter temperatures at 325° F. The die temperature was 325° F.

The lamination process was accomplished by using the same three roll vertical stack of controlled temperature rolls (FIG. 12), this time all rolls being polished chrome plated steel with all rolls being temperature controlled to 70° F. The top and middle rolls were gapped at about 0.100 inch and all rolls were rotating at 9 feet per minute. The adhesive film layer of composition V was estimated to be about 0.007 inch thick, the overall thickness of the cover assembly was about 0.091 inch thick. The resulting cover assembly is illustrated in FIG. 7.

Procedure I For Making A Film

Cast polymer film samples were prepared by first weighing the specified quantity of each polymer pellet in a bucket. The weight percentages for each sample of the polymers are specified in Tables 2–7. The polymer pellets for each sample were combined in a five gallon polyethylene bag. The bag of pellets was then tumbled and shaken until a uniform blend of pellets was obtained. Once the polymer pellets were uniformly blended, the premixed blend of polymers were then melt extruded by a 1.5 inch Johnson extruder through an 8 inch sheet die at temperatures ranging from 350 to 450° F. The temperature of the extrusion was set to maintain an extrusion pressure less than 3600 psi. The melt sheet was extruded and then introduced into a nip. The nip was located between the top and middle roll of a vertical stack of three temperature-controlled co-rotating 5-inch diameter (12.70 cm) cylindrical rolls. The cylindrical rolls were part of a vertical 3 roll casting station available from Killion Company, Cedar Grove, N.J. The temperature of the rolls was controlled to 60 to 70° F. using individual Sterlco Model M29410-ACX temperature control units available from Sterling Inc., Milwaukee, Wis. As the molten sheet was solidified by the chilled roll surfaces, the top roll released the sheet to follow the middle roll, and the quenched sheet was subsequently stripped away from the bottom roll. Films made by this process were typically about 0.015 inches (0.038 cm) to 0.025 inches (0.064 cm) thick.

Procedure II For Measuring The Tacticity of Polypropylene

Tacticity of polypropylenes were determined by carbon-13 NMR spectra in o-dichlorobenzene (ODCB) at 110° C. following procedures outlined in "NMR Spectroscopy and Polymer Microstructure", Alan E. Tonelli, VCH Publishers Inc. New York, N.Y., 1989, herein incorporated by reference.

Test Procedure I For Measuring The Load At Break Tensile Strength

The tensile properties of the subject polymer compositions in the form of sample films were evaluated based on procedures described in ASTM Test Method D 882, "Tensile Properties of Thin Plastic Sheeting", incorporated herein by reference. A comprehensive listing of tensile properties, testing procedures, and property calculations are cited in ASTM D882. For the subject compositions at least three 6 inch by ½ inch (15.24 cm×1.27 cm) specimens were cut from each film sample. The average thickness for each film sample was determined by measuring each film specimen and computing an arithmetic average for the film sample. The ends of the film specimens were clamped into a constant rate of extension tensile testing machine, SINTECH serial # T30/88/125 available from MTS Systems Corporation, Cary, N.C. Data acquisition, tensile property calculations, and machine control was performed via TESTWORKS Version 2.1 software available from MTS Systems Corporation, Cary, N.C. For the subject examples the breaking load in pounds, tensile breaking stress in pounds per square inch, percent elongation at break, and percent elongation at yield were utilized for film comparison.

Test Procedure II For Measuring Abrasion Resistance

To assess the abrasion resistance of polymer compositions the grams braded on each film sample was measured on a Dual Taber Abraser, Model 505 available from Teledyne Taber, North Tonawanda, N.Y. Abrasion test samples were prepared by first attaching the previously prepared films to 11 point manila paper stock using a two sided pressure sensitive adhesive such as SCOTCH 9851 available from Minnesota Mining and Manufacturing Co, St. Paul, Minn. At least three abrasion test discs per film sample, about 4 inches (10.16 cm) in diameter with a ¼ inch (0.64 cm) center hole, were cut from each PSA laminated film sample for abrasion and weighed prior to testing. Each abrasion test disc sample was placed on the abrading turntable and secured with the hold down ring and center nut and washer. The sample abrasion discs were abraded for 1000 cycles at a load of 1000 grams with Calibrade H-18 abrasive wheels. Upon completion of the test the samples were cleaned of loose debris and weighed. The grams abraded was then calculated by subtraction of the after test weight from the before test weight. For additional details covering this procedure, please refer to "Operating Instruction for Taber Model 505 Dual Abraser", Teledyne Taber, North Tonawanda, N.Y., 1967, incorporated herein by reference.

Test Procedure III For Measuring The Load At Break

See Test Procedure 1

Test Procedure IV For Measuring The Percent Elongation At Break

See Test Procedure 1

Test Procedure V For Measuring The Breaking Stress

See Test Procedure 1

Test Procedure VI For Measuring Percent Elongation At Break

See Test Procedure 1

Test Procedure VII For Measuring Percent Elongation At Yield

See Test Procedure 1

Test Procedure VIII For Measuring The Static Coefficient Of Friction

The static coefficient of friction for each film sample was measured on a Thwing-Albert Model 225-1 Friction/Peel Tester available from Thwing-Albert Instrument Company, Philadelphia, Pennsylvania. Equipment operation is specified in the Thwing-Albert Instruction Manual, Friction/Peel Tester, Model #225-1 revised 5/94, Software version 2.4. This analysis for the static coefficient of friction measured the horizontal force required to cause movement of a weighted 2 inch (5.08 cm) by 2 inch (5.08 cm) sample of the polymer film against a sample of cloth. The film samples were tested against three different cloth samples; a 14 oz cotton denim cloth, a cellulose acetate fabric (about 100×50, warp yarn {about 36 fibers at 4 denier}×fill yarn {about 20 fibers at 9 denier}), manufactured by Delta Woodside Industries, Greenville, S.C. and a nylon fabric (Style 3204190, 630 denier nylon yarn, 41×41, manufactured by Highland Industries, Inc. Greensboro, N.C.

The friction test specimen were prepared by anchoring a 2 inch (5.08 cm) by 2 inch (5.08 cm) sample of each film to a 2 inch (5.08 cm) by 2 inch (5.08 cm) metal test sled. The test specimen were attached to the sled with a two sided pressure sensitive adhesive such as SCOTCH 9851, available from Minnesota Mining and Manufacturing Company, St. Paul, Minn. The metal test sled weighed 500 grams. An additional weight of 500 grams was applied to the top of the block making the total weight 1000 grams.

To prepare the fabric sample for the friction test a sample fabric approximately 4 inches (10.16 cm) by 12 inches (30.48 cm) was anchored to a metal sheet with a two sided pressure sensitive adhesive tape, such as SCOTCH 9851 to prevent movement and wrinkling of the cloth during the test. The fabric samples prepared for testing were cellulose acetate fabric, denim fabric, and nylon fabric. The cellulose acetate fabric was oriented with the fill yarns parallel to the 12 inch direction of the samples. The 14 oz. denim fabric was tested with the lighter colored (back side) of the cloth to the friction material. The nylon fabric was tested with the fabric parallel to the warp or fill yarns. Each friction test was performed on a new section of cloth parallel to the 12 inch direction on the metal panel.

The metal sheet with the cloth sample adhered was clamped on to the metal platen testing surface with the provided spring clip. The metal test sled with film sample on bottom of the sled and additional weight weighing 1000 grams in total was placed on the fabric and pulled for 10 seconds at a speed of 2 inches (5.08 cm) per minute across the fabric per instructions specified in the instructions manual. The static coefficient of friction was then calculated by the machine wherein the measured horizontal force to cause slippage on the fabric was divided by the 1000 gram normal force of the sled. At least five measurements were recorded for each friction test sample and pull roll cover sample on each fabric. Arithmetic averages were calculated by the friction/peel tester.

Example 1

Example 1 films were created from a series of polymer blends of a polypropylene comprising greater than 90 percent isotactic linkages and a thermoplastic block copolymer. The films were created by Procedure I For Making A Film. The percent isotactic linkages of Polymer D was shown to be about 90.5 percent isotactic linkages by Procedure II for Measuring The Tacticity of Polypropylene. The films also included a thermoplastic block copolymer, Polymer A. The weight percent of each polymer in the blend was illustrated in Table 2. The film sample thickness, load at break, breaking stress, percent elongation at break, percent elongation at yield, and the static coefficient of friction were determined by the aforementioned test procedures. Films made solely from Polymer I, Polymer A, and Polymer D were also tested by the aforementioned procedures and illustrated for comparison in Table 2.

breaking stress measurement of 3974. The tensile breaking stress measurement of Polymer D was 4769 and the tensile breaking stress of Polymer A was 873. The blend had a measurement in between that of Polymer D and Polymer A. All films tested produced tensile breaking stress measurements between the tensile breaking stress measurements of films made of Polymer A or Polymer D.

Example 2

Example 2 films were created from a series of polymer blends of a polypropylene comprising less than 90 percent isotactic linkages and a thermoplastic block copolymer. The films were created by Procedure I For Making A Film. The percent isotactic linkages of Polymer C was shown to be about 66.0 percent isotactic linkages by Procedure II for Measuring The Tacticity of Polypropylene. The films also included a thermoplastic block copolymer, Polymer A. The weight percent of each polymer in the blend was illustrated

TABLE 2

| Polymer Blend Identification | Tensile Thickness (inches) | Load at Break (pounds) | Tensile Breaking Stress (psi) | Percent Elongation At Break | Grams Abraded (grams) | Static Coefficient of Friction on Denim | Static Coefficient of Friction on Nylon | Static Coefficient of Friction on Cellulose Acetate | Percent Elongation at Yield |
| --- | --- | --- | --- | --- | --- | --- | --- | --- | --- |
| Polymer D | 0.015 | 36.7 | 4769 | 583 | 0.064 | 0.22 | 0.26 | 0.30 | 6.9 |
| 70% Polymer D/30% Polymer A | 0.018 | 35.8 | 3974 | 538 | 0.153 | 0.32 | 0.34 | 0.39 | 5.9 |
| 60% Polymer D/40% Polymer A | 0.020 | 36.3 | 3639 | 532 | 0.173 | 0.51 | 0.46 | 0.46 | 5.4 |
| 50% Polymer D/50% Polymer A | 0.022 | 35.4 | 3216 | 513 | 0.145 | 0.51 | 0.58 | 0.59 | 6.0 |
| 40% Polymer D/60% Polymer A | 0.023 | 40.8 | 3517 | 540 | 0.185 | 0.72 | 0.73 | 0.70 | 8.2 |
| 30% Polymer D/70% Polymer A | 0.025 | 38.2 | 3109 | 542 | 0.181 | 0.91 | 0.91 | 0.91 | 6.9 |
| Polymer A | 0.023 | 9.9 | 873 | 401 | 0.177 | 1.59 | 1.84 | 1.82 | 34.9 |
| Polymer I | 0.017 | 18.8 | 2167 | 436 | 0.037 | 1.11 | 1.15 | 1.07 | 30.2 |

Table 2 illustrates film blends comprising polypropylene with greater than 90 percent isotactic linkages have measured physical characteristics falling between the measured physical characteristics of films made solely of the specified polypropylene and films made solely of specified thermoplastic block copolymers. For example, the blend comprising 70 percent Polymer D and 30 percent Polymer A had a in Table 3. The film sample thickness, load at break, breaking stress, percent elongation at break, percent elongation at yield, and the static coefficient of friction were determined by the aforementioned test procedures. Films made solely from Polymer A, Polymer C, and Polymer I were also tested by the aforementioned procedures and illustrated for comparison in Table 3.

TABLE 3

| Polymer Blend Identification | Tensile Thickness (inches) | Load at Break (pounds) | Tensile Breaking Stress (psi) | Percent Elongation At Break | Grams Abraded (grams) | Static Coefficient of Friction on Denim | Static Coefficient of Friction on Nylon | Static Coefficient of Friction on Cellulose Acetate | Percent Elongation at Yield |
| --- | --- | --- | --- | --- | --- | --- | --- | --- | --- |
| Polymer C | 0.019 | 20.3 | 2138 | 468 | 0.191 | 0.48 | 0.38 | 0.52 | 16.1 |
| 75% Polymer C/25% Polymer A | 0.015 | 16.8 | 2324 | 504 | 0.155 | 0.54 | 0.49 | 0.51 | 15.2 |
| 60% Polymer C/40% Polymer A | 0.020 | 30.3 | 3060 | 641 | 0.159 | 1.06 | 0.89 | 0.91 | 13.9 |
| 50% Polymer C/50% Polymer A | 0.019 | 27.4 | 2767 | 602 | 0.149 | 0.89 | 0.85 | 0.91 | 17.5 |
| 40% Polymer C/60% Polymer A | 0.022 | 27.2 | 2536 | 594 | 0.197 | 1.26 | 1.20 | 1.20 | 19.2 |
| 30% Polymer C/70% Polymer A | 0.022 | 26.5 | 2355 | 565 | 0.101 | 1.33 | 1.33 | 1.31 | 32.3 |
| 25% Polymer C/75% Polymer A | 0.015 | 16.7 | 2289 | 540 | 0.107 | 1.12 | 1.15 | 1.31 | 19.9 |
| 20% Polymer C/80% Polymer A | 0.022 | 22.1 | 1944 | 555 | 0.055 | 1.64 | 1.38 | 1.43 | 18.6 |

TABLE 3-continued

| Polymer Blend Identification | Tensile Thickness (inches) | Load at Break (pounds) | Tensile Breaking Stress (psi) | Percent Elongation At Break | Grams Abraded (grams) | Static Coefficient of Friction on Denim | Static Coefficient of Friction on Nylon | Static Coefficient of Friction on Cellulose Acetate | Percent Elongation at Yield |
|---|---|---|---|---|---|---|---|---|---|
| Polymer A | 0.023 | 9.9 | 873 | 401 | 0.177 | 1.59 | 1.84 | 1.82 | 34.9 |
| Polymer I | 0.017 | 18.8 | 2167 | 436 | 0.037 | 1.11 | 1.15 | 1.07 | 30.2 |

Table 3 illustrates that films formed from blend compositions of Polymer A and Polymer C have physical measurements more desirable than the physical measurements of solely Polymer A or Polymer C used to make the composition. For example, a blend comprising 60 percent Polymer C and 40 percent Polymer A had a tensile breaking stress of 3060. The tensile breaking stress of a film made of Polymer C was 2138 and the tensile breaking stress of a film made of Polymer A was 873. The blend had a tensile breaking stress measurement greater than Polymer A and Polymer C. A high tensile breaking stress measurement is desirable. In addition, the elongation at break measurements are primarily all greater for the polymer blends than the measurements of films made solely of Polymer A and the films made solely of Polymer C. Synergy is observed because the films made of the blends have characteristics more desirable than the films made of specified polymers used to make the composition.

Abrasion resistance as defined by Test Procedure II For Measuring Abrasion Resistance was also measured as the amount of grams abraded from the film. The films produced from polymer blends of Polymer A and Polymer C typically have less grams abraded than the films made solely of Polymer A and films made solely of Polymer C. For example, a blend comprising 60 percent Polymer C and 40 percent Polymer A had an abrasion resistance measurement of 0.159. The abrasion resistance measurement of a film made only of Polymer C was 0.191 and a film made only of Polymer A was 0.177. The film made of a blend of polymers had an abrasion resistance measurement less than films made of Polymer A and films made of Polymer C. A low abrasion resistance measurement is desirable. In Table 3, all of the films made from a blend of Polymer A and Polymer C, except one film, had less grams removed during the abrasion test than the films made from polymers.

Static coefficient of friction values of the films produced in Example 2 were also measured. The static coefficient of friction values of the films produced from blends of Polymer C and the Polymer A fall between the static coefficient of friction values of the film made solely of Polymer A and the film made solely of Polymer C. However, in Example 2, the film produced from polymer blends of 60 percent Polymer C and 40 percent Polymer A had a coefficient of friction value approaching 1.0. Compared to Example 1, the film produced from polymer blends of 60 percent Polymer D and 40 percent Polymer A had a coefficient of friction value approaching 0.5. At a specific weight percent blend composition, the static coefficient of friction of the films produced in Example 1 had a lower static coefficient of friction than the films produced in Example 2.

Example 3

Example 3 films were created from a series of polymer blends of a polypropylene comprising less than 90 percent isotactic linkages and a thermoplastic block copolymer. The films were created by Procedure I For Making A Film. The percent isotactic linkages of Polymer B was shown to be about 52.1 percent isotactic linkages by Procedure II for Measuring The Tacticity of Polypropylene. The films also included a thermoplastic block copolymer, Polymer A. The weight percent of each polymer in the blend was illustrated in Table 4. The film sample thickness, load at break, breaking stress, percent elongation at break, percent elongation at yield, and the static coefficient of friction were determined by the aforementioned test procedures. Films made solely from Polymer A, Polymer B, and Polymer I were also tested by the aforementioned procedures and illustrated for comparison in Table 4.

TABLE 4

| Polymer Blend Identification | Tensile Thickness (inches) | Load at Break (pounds) | Tensile Breaking stress (psi) | Percent Elongation At Break | Grams Abraded (grams) | Static Coefficient of Friction on Denim | Static Coefficient of Friction on Nylon | Static Coefficient of Friction on Cellulose Acetate | Percent Elongation at Yield |
|---|---|---|---|---|---|---|---|---|---|
| Polymer B | 0.023 | 18.0 | 1522 | 597 | 0.217 | 0.59 | 0.75 | 0.72 | 27.9 |
| 80% Polymer B/20% Polymer A | 0.021 | 21.9 | 2105 | 627 | 0.134 | 0.90 | 1.03 | 0.98 | 25.2 |
| 70% Polymer B/30% Polymer A | 0.023 | 31.5 | 2759 | 675 | 0.164 | 0.70 | 0.94 | 0.81 | 19.8 |
| 60% Polymer B/40% Polymer A | 0.021 | 26.4 | 2488 | 666 | 0.111 | 1.01 | 1.19 | 1.05 | 26.6 |
| 50% Polymer B/50% Polymer A | 0.022 | 26.9 | 2516 | 677 | 0.134 | 1.12 | 1.40 | 1.39 | 22.4 |
| 40% Polymer B/60% Polymer A | 0.021 | 28.5 | 2713 | 639 | 0.088 | 1.23 | 1.42 | 1.29 | 20.1 |
| Polymer A | 0.023 | 9.9 | 873 | 401 | 0.177 | 1.59 | 1.84 | 1.82 | 34.9 |
| Polymer I | 0.017 | 18.8 | 2167 | 436 | 0.037 | 1.11 | 1.15 | 1.07 | 30.2 |

Table 4 illustrates that films made from a blend composition of Polymer A and Polymer B have physical characteristic measurements more desirable than the physical characteristic measurements solely of Polymer A or solely of Polymer B used to make the composition. Synergy is observed because the polymer blends have more desirable characteristics than the individual polymers used to make the composition. When abrasion resistance was measured, all films produced from these polymer blends had less grams abraded than the films produced solely from Polymer A and films produced solely from Polymer B. It is desirable that a film have a low number of grams removed during the abrasion test because such films are characteristically more durable than films having a high number of grams removed during the abrasion test.

Static coefficient of friction values of the films produced in Example 3 were also measured. The static coefficient of friction values of the films produced from blends of Polymer B and Polymer A fall between the static coefficient of friction measurements of the film made solely of Polymer A and the film made solely of Polymer B. In Example 3, the film produced from polymer blends of 60 percent Polymer B and 40 percent Polymer A had a coefficient of friction value exceeding 1.0. In Example 1, the film produced from polymer blends of 60 percent Polymer D and 40 percent Polymer A had a coefficient of friction value approaching 0.5. At a specific weight percent blend composition, the static coefficient of friction of the films produced in Example 1 had a lower static coefficient of friction than the films produced in Example 3 or Example 2.

Example 4

Example 4 films were created from a series of polymer blends of a metallocene-catalyzed polypropylene, Polymer U, and a thermoplastic block copolymer. The films were created by Procedure I For Making A Film. The films also included a thermoplastic block copolymer, Polymer A. The weight percent of each polymer in the blend was illustrated in Table 5. The film sample thickness, load at break, breaking stress, percent elongation at break, percent elongation at yield, and the static coefficient of friction were determined by the aforementioned test procedures. Films made solely from Polymer A and Polymer U were also tested by the aforementioned procedures and illustrated for comparison in Table 5.

Table 5 illustrates that the blends of metallocene-catalyzed propylenes and thermoplastic block copolymers have a coefficient of friction of greater than 0.6. In addition, the blends have desirable tensile breaking stress, percent elongation at break, and abrasion resistance characteristics.

Example 5

Example 5 films were created from a series of polymer blends of a metallocene-catalyzed polypropylene, Polymer V, and a thermoplastic block copolymer. The films were created by Procedure I For Making A Film. The films also included a thermoplastic block copolymer, Polymer A. The weight percent of each polymer in the blend was illustrated in Table 6. The film sample thickness, load at break, breaking stress, percent elongation at break, percent elongation at yield, and the static coefficient of friction were determined by the aforementioned test procedures. Films made solely from Polymer A and Polymer V were also tested by the aforementioned procedures and illustrated for comparison in Table 6.

TABLE 5

| Polymer Blend Identification | Tensile Thickness (inches) | Load at Break (pounds) | Tensile Breaking Stress (psi) | Percent Elongation At Break | Grams Abraded (grams) | Static Coefficient of Friction on Denim | Static Coefficient of Friction on Nylon | Static Coefficient of Friction on Cellulose Acetate | Percent Elongation at Yield |
|---|---|---|---|---|---|---|---|---|---|
| Polymer U | 0.026 | 28.8 | 2214 | 670 | 0.096 | 0.55 | 0.52 | 0.62 | 21.2 |
| 75% Polymer U/25% Polymer A | 0.027 | 30.1 | 2210 | 670 | 0.172 | 0.63 | 0.73 | 0.74 | 26.7 |
| 50% Polymer U/50% Polymer A | 0.030 | 31.4 | 2097 | 660 | 0.118 | 0.87 | 0.99 | 0.88 | 38.8 |
| 25% Polymer U/75% Polymer A | 0.030 | 32.9 | 2196 | 636 | 0.090 | 1.15 | 1.08 | 1.12 | 34.0 |
| Polymer A | 0.023 | 9.9 | 873 | 401 | 0.177 | 1.59 | 1.84 | 1.82 | 34.9 |

TABLE 6

| Polymer Blend Identification | Tensile Thickness (inches) | Load at Break (pounds) | Tensile Breaking Stress (psi) | Percent Elongation at Break | Grams Abraded (grams) | Static Coefficient of Friction on Denim | Static Coefficient of Friction on Nylon | Static Coefficient of Friction on Cellulose Acetate | Percent Elongation at Yield |
|---|---|---|---|---|---|---|---|---|---|
| Polymer V | 0.026 | 32.3 | 2488 | 571 | 0.146 | 0.35 | 0.37 | 0.43 | 17.1 |
| 75% Polymer S/25% Polymer A | 0.027 | 34.1 | 2527 | 631 | 0.158 | 0.61 | 0.62 | 0.54 | 17.2 |
| 50% Polymer V/50% Polymer A | 0.029 | 35.7 | 2443 | 637 | 0.145 | 0.86 | 0.83 | 0.76 | 17.1 |
| 25% Polymer V/75% Polymer A | 0.031 | 34.8 | 2227 | 614 | 0.066 | 1.09 | 1.17 | 1.04 | 17.1 |
| Polymer A | 0.023 | 9.9 | 873 | 401 | 0.177 | 1.59 | 1.84 | 1.82 | 34.9 |

Example 6

Example 6 films were created from a series of polymer blends of a polypropylene comprising less than 90 percent isotactic linkages and a thermoplastic block copolymer. The films were created by Procedure I For Making A Film. The percent isotactic linkages of Polymer C was shown to be about 66.0 percent isotactic linkages by Procedure II for Measuring The Tacticity of Polypropylene. The films also included a thermoplastic block copolymer, Polymer T. The weight percent of each polymer in the blend was illustrated in Table 7. The film sample thickness, load at break, breaking stress, percent elongation at break, percent elongation at yield, and the static coefficient of friction were determined by the aforementioned test procedures. A film made solely from Polymer C was also tested by the aforementioned procedures and illustrated for comparison in Table 7.

Example 7

Example 7 compares eight conventional roll covers used in the textile industry with two roll covers of the present invention having different roll cover surface topographies. The conventional roll covers include Style G-520, Style 5006-RT Blue, Style B-832 Orange, Style P. S. Cork w/ PSA, Style 732 Plain R, Style CB-1 Brown Rufftop, Style 721 Orange S/F R, 860H Textured. Additional information concerning the roll covers was provide in Table 8. The two roll covers of the present invention include roll covers made by method M1 and M2. The abrasion resistance measured as

TABLE 7

| Polymer Blend Identification | Tensile Thickness (inches) | Load at Break (pounds) | Tensile breaking stress (psi) | Percent Elongation at Break | Grams Abraded (grams) | Static Coefficient of Friction on Denim | Static Coefficient of Friction on Nylon | Static Coefficient of Friction on Cellulose Acetate | Percent Elongation at Yield |
|---|---|---|---|---|---|---|---|---|---|
| Polymer C | 0.019 | 20.2 | 2138 | 468 | 0.191 | 0.48 | 0.38 | 0.52 | 16.1 |
| 60% Polymer C/40% Polymer T | 0.019 | 19.1 | 1986 | 611 | 0.246 | 0.75 | 0.83 | 0.83 | 13.6 |
| 40% Polymer C/60% Polymer T | 0.018 | 11.0 | 1199 | 442 | 0.295 | 1.00 | 0.87 | 0.69 | 15.7 |

The Table 7 illustrates that the blends of Polymer C and Polymer T have static coefficient of friction values of greater than 0.6.

grams abraded and the static coefficient of friction of the roll covers were determined by the above Test Procedures. The results are in Table 8.

TABLE 8

| Product Identification | Grams Abraded (grams) | Static Coefficient of Friction on Denim | Static Coefficient of Friction on Nylon | Static Coefficient of Friction on Cellulose Acetate |
|---|---|---|---|---|
| Style G520; Day International, Inc. Greenville, SC. | 0.282 | 0.67 | 0.63 | 0.73 |
| Style 5006-RT Blue; McLeod Belting Co., Inc., Greensboro, North Carolina | 0.644 | 0.91 | 0.91 | 0.90 |
| Style B-832 Orange; McLeod Belting Co., Inc., Greensboro, North Carolina | 0.579 | 0.96 | 0.99 | 0.95 |
| Style P.S. Cork w/PSA; McLeod Belting Co., Inc., Greensboro, North Carolina | 0.623 | 0.61 | 0.59 | 0.89 |
| Style 732 Plain R; Carolina Belting Co., Taylors, South Carolina | 0.561 | 0.96 | 0.97 | 0.94 |
| Style CB-1 Brown Rufftop R; Carolina Belting Co., Taylors, South Carolina | 1.479 | 1.0 | 0.91 | 0.89 |

TABLE 8-continued

| Product Identification | Grams Abraded (grams) | Static Coefficient of Friction on Denim | Static Coefficient of Friction on Nylon | Static Coefficient of Friction on Cellulose Acetate |
|---|---|---|---|---|
| Style 721 Orange S/F R; Carolina Belting Co., Taylors, South Carolina | 0.799 | 0.87 | 0.75 | 0.90 |
| 3M 860H Textured; Minnesota Mining and Manufacturing, St. Paul, Minnesota | 0.247 | 0.64 | 0.47 | 0.67 |
| Method Example M1 | 0.154 | 0.88 | 1.12 | 1.1 |
| Method Example M2 | 0.451 | 0.96 | 0.98 | 0.9 |

Table 8 illustrates that the roll covers of the present invention are highly durable and have a high coefficient of friction.

We claim:

1. A method for forming a cover capable of adhering to a substrate surface, the method comprising:

providing a film having first and second major sides, the first side comprising an array of hook structures;

providing a porous sheet having first and second major sides;

aligning the first side of the porous sheet against the second side of the film;

introducing a molten thermoplastic material onto the second side of the porous sheet;

simultaneously urging the molten thermoplastic material against the porous sheet to force portions of the thermoplastic material to flow through the porous sheet and into adhering contact with the second side of the film, and molding a desired topography on an exposed surface of the molten thermoplastic material; and cooling the molten thermoplastic material to adhere the film to the porous sheet to provide the cover.

2. The method of claim 1 wherein the urging and molding step includes:

advancing the aligned film and porous sheet and molten thermoplastic material thereon through a nip between a first roll which engages the first side of the film and a second roll which engages the exposed surface of the thermoplastic material.

3. The method of claim 2 wherein the urging and molding step includes:

controlling the thermal levels of the first and second rolls.

4. The method of claim 2 wherein the cooling step includes:

advancing the film and porous sheet and molten thermoplastic material thereon about a portion of the second roll and then about a portion of a third roll.

5. The method of claim 4 wherein the cooling step includes:

controlling the thermal level of the third roll.

6. The method of claim 2 wherein the second roll has a surface topography thereon.

7. The method of claim 1 wherein the desired topography is selected from the group consisting of smooth, uniformly textured and randomly textured surfaces, or combinations thereof.

8. The method of claim 1 wherein the porous sheet is a woven fabric.

9. The method of claim 1 wherein the porous sheet is a nonwoven fabric.

10. The method of claim 1 wherein the cover is flexible.

11. The method of claim 2 further comprising:

spacing the nip between the first and second rolls to permit advancement of the film and porous sheet and molten thermoplastic material thereon through the nip without destructively crushing the array of hook structures on the first side of the film.

12. The method of claim 1, and further comprising:

defining the thermoplastic material as a polypropylene selected from the group consisting of a polypropylene comprising less than 90 percent isotactic linkages and a thermoplastic block copolymer comprising hard segments of polystyrene combined with soft segments, the thermoplastic block copolymer having a Shore A hardness greater than about 30.

13. The method of claim 1, and further comprising:

defining the thermoplastic material as a metallocene-catalyzed polypropylene and a thermoplastic block copolymer comprising hard segments of polystyrene combined with soft segments, the thermoplastic block copolymer having a Shore A hardness of greater than 30.

14. The method of claim 1, and further comprising:

defining the thermoplastic material as a metallocene-catalyzed polyolefin and a thermoplastic block copolymer comprising hard segments of polystyrene combined with soft segments to provide the first surface with a coefficient of friction of greater than about 0.6.

* * * * *

UNITED STATES PATENT AND TRADEMARK OFFICE
CERTIFICATE OF CORRECTION

PATENT NO. : 6,060,009
DATED : May 9, 2000
INVENTOR(S) : Dennis G. Welygan and Louis S. Moren It is certified that error appears in the above-identified patent and that said Letters Patent is hereby corrected as shown below:

Column 3,
Line 24, "he cover" should read -- the cover --

Column 22,
Line 8, insert -- of -- between "adhesion" and "the"

Column 20,
Line 17, "5.0 inch" should read -- 5.0 inches --

Column 23,
Line 7, "5.0 inch" should read  5.0 inches --
Line 54, "0.1 05 inch" should read -- 0.105 inch --

Column 33,
Table 6, first column, "75% Polymer S/25%" should read -- 75% PolymerV/25% --

Signed and Sealed this

Nineteenth Day of March, 2002

Attest:

*Attesting Officer*

JAMES E. ROGAN
*Director of the United States Patent and Trademark Office*